Figure 13:
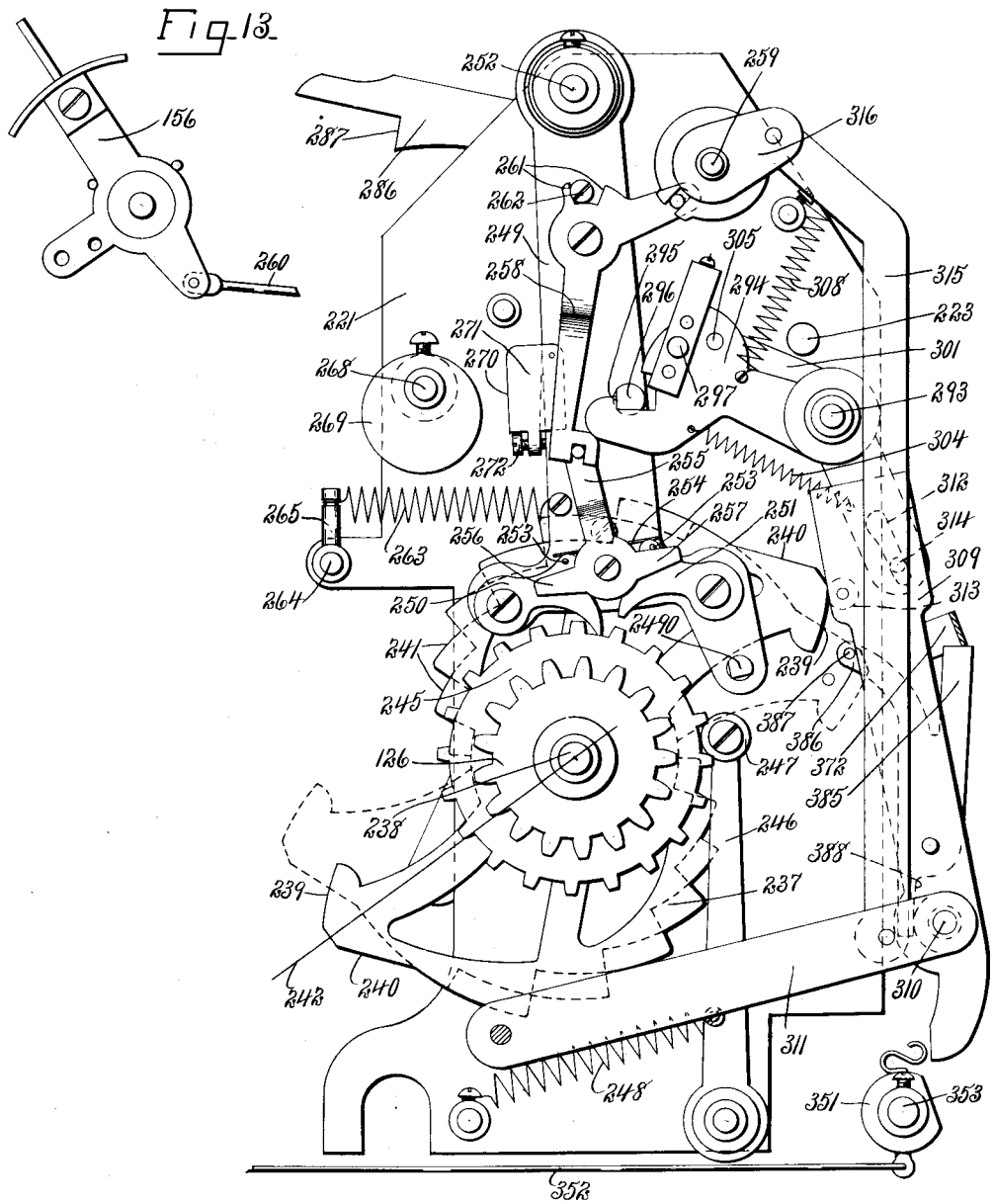

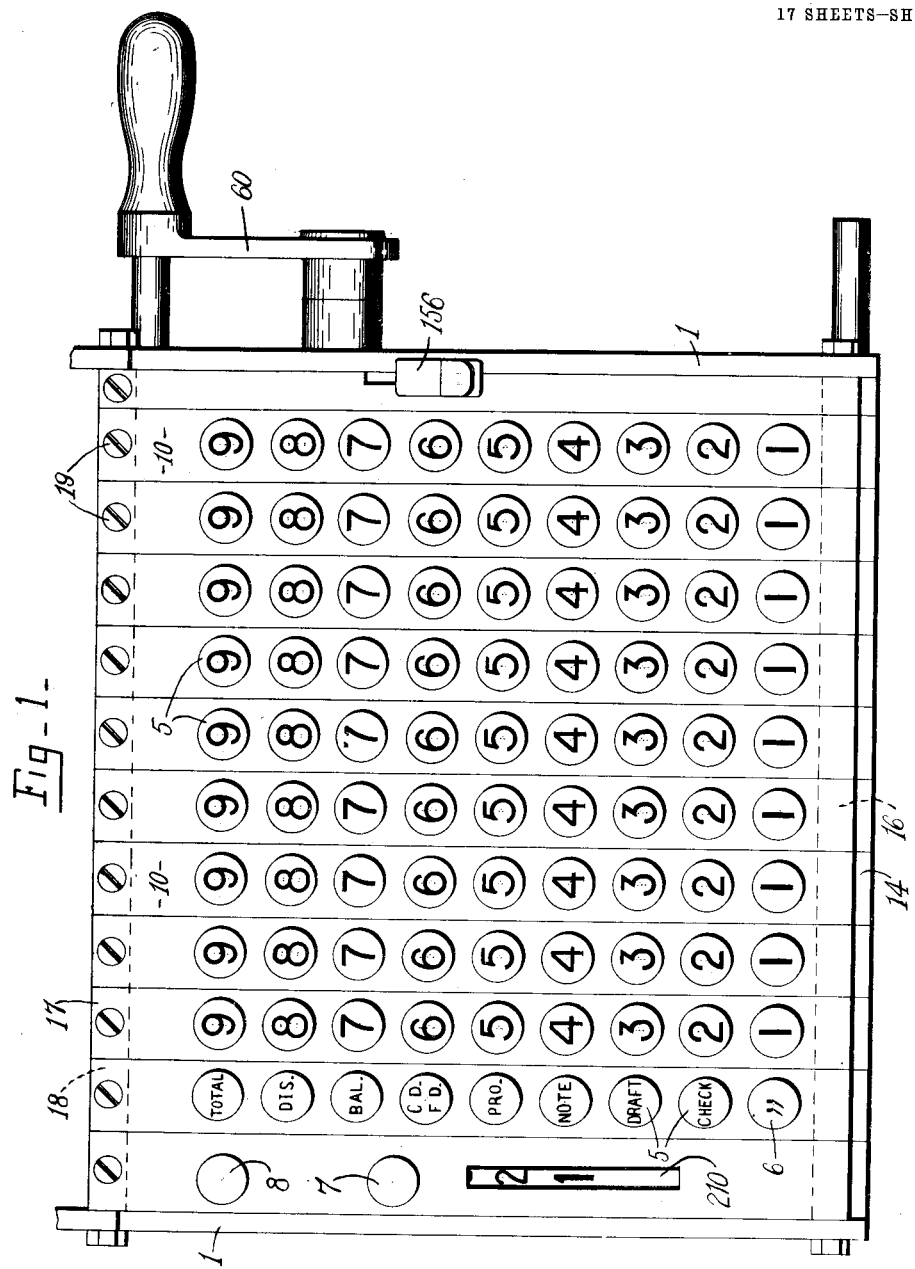

W. LE G. BUNDY.
CALCULATING MACHINE.
APPLICATION FILED SEPT. 22, 1905. RENEWED JAN. 19, 1911.
1,117,200.
Patented Nov. 17, 1914.
17 SHEETS—SHEET 2.
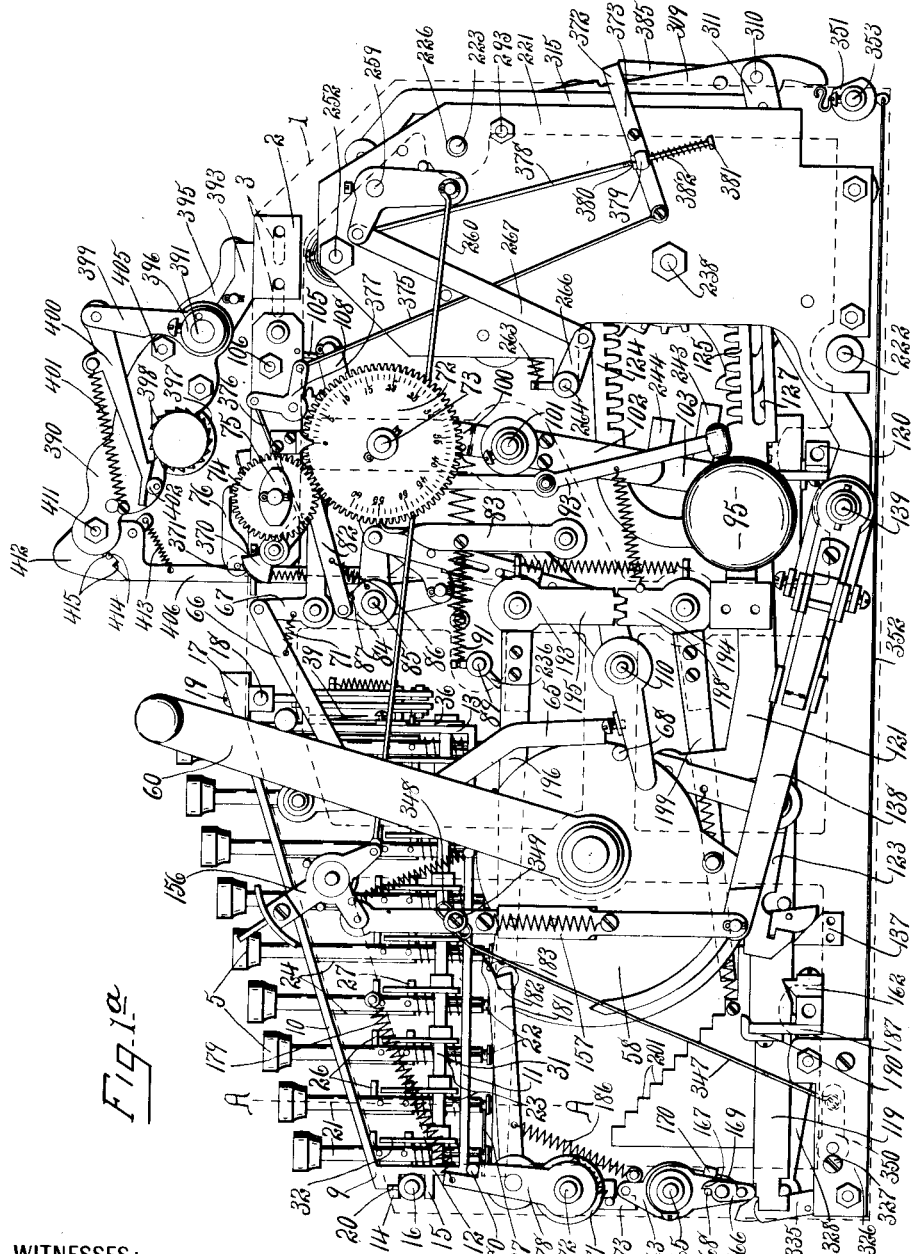
WITNESSES:
Chas. J. Toner.
Chas. H. Young.
INVENTOR
Willard Le Grand Bundy
BY
Hey & Parsons
ATTORNEYS W. LE G. BUNDY.
CALCULATING MACHINE.
APPLICATION FILED SEPT. 22, 1905. RENEWED JAN. 19, 1911.
1,117,200.
Patented Nov. 17, 1914.
17 SHEETS—SHEET 3.
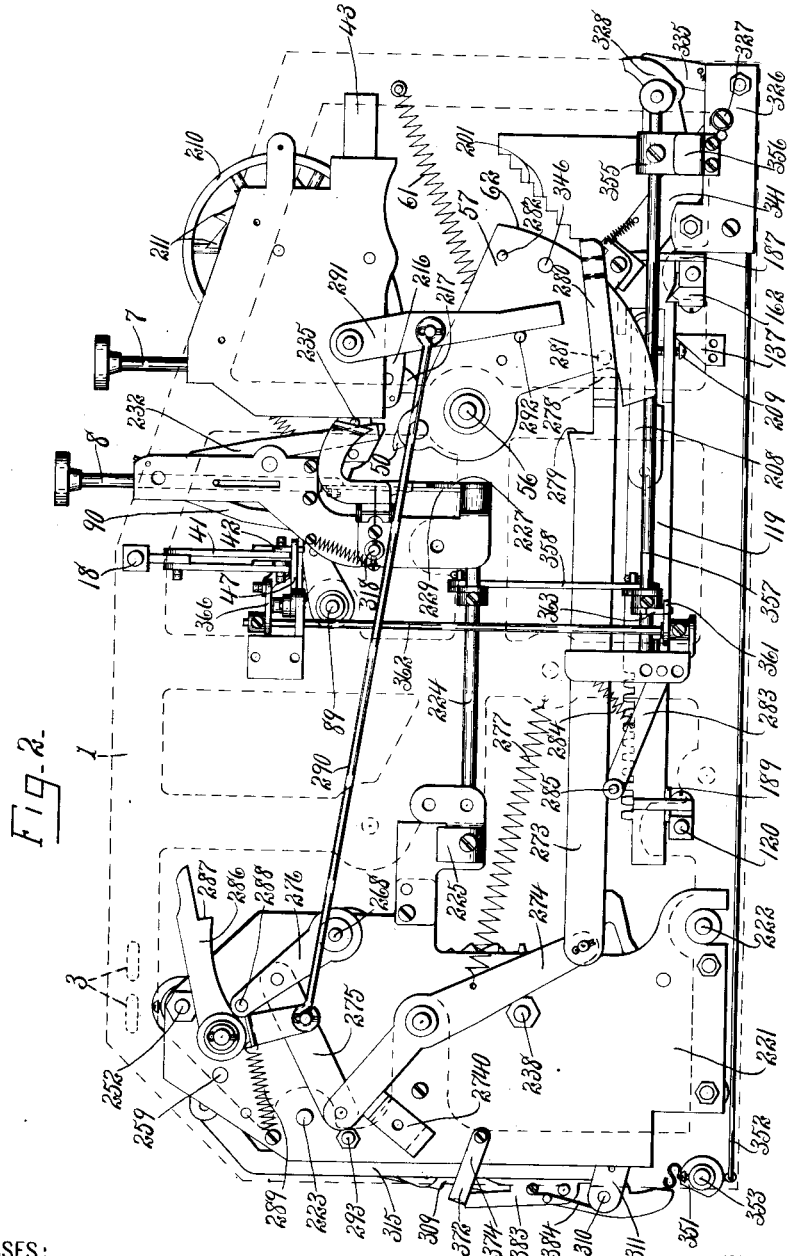

W. LE G. BUNDY.
CALCULATING MACHINE.
APPLICATION FILED SEPT. 22, 1905. RENEWED JAN. 19, 1911.
1,117,200.
Patented Nov. 17, 1914.
17 SHEETS—SHEET 4.
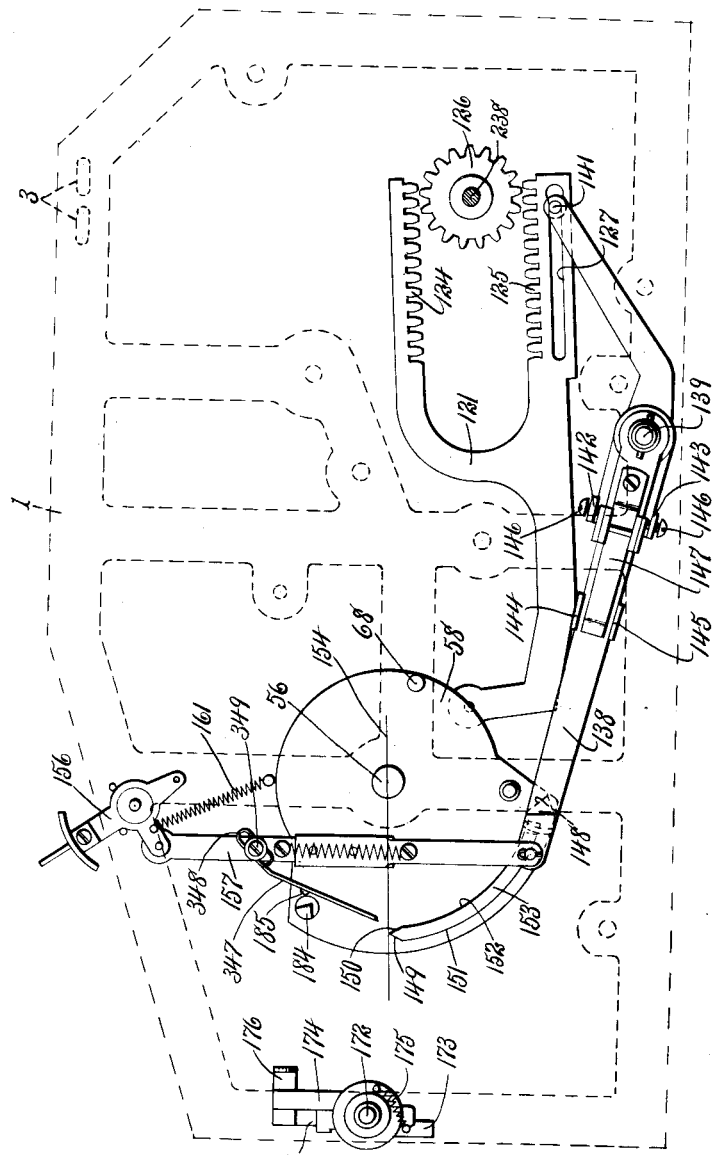
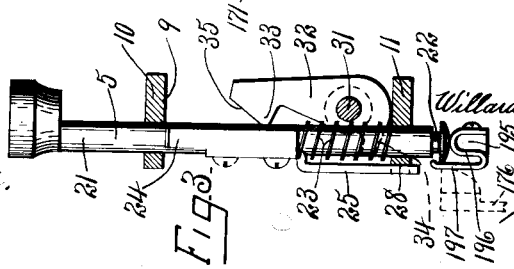
WITNESSES:
Chas J Toner
Chas H Young
INVENTOR
Willard Le Grand Bundy
BY
Aty Parsons
ATTORNEYS

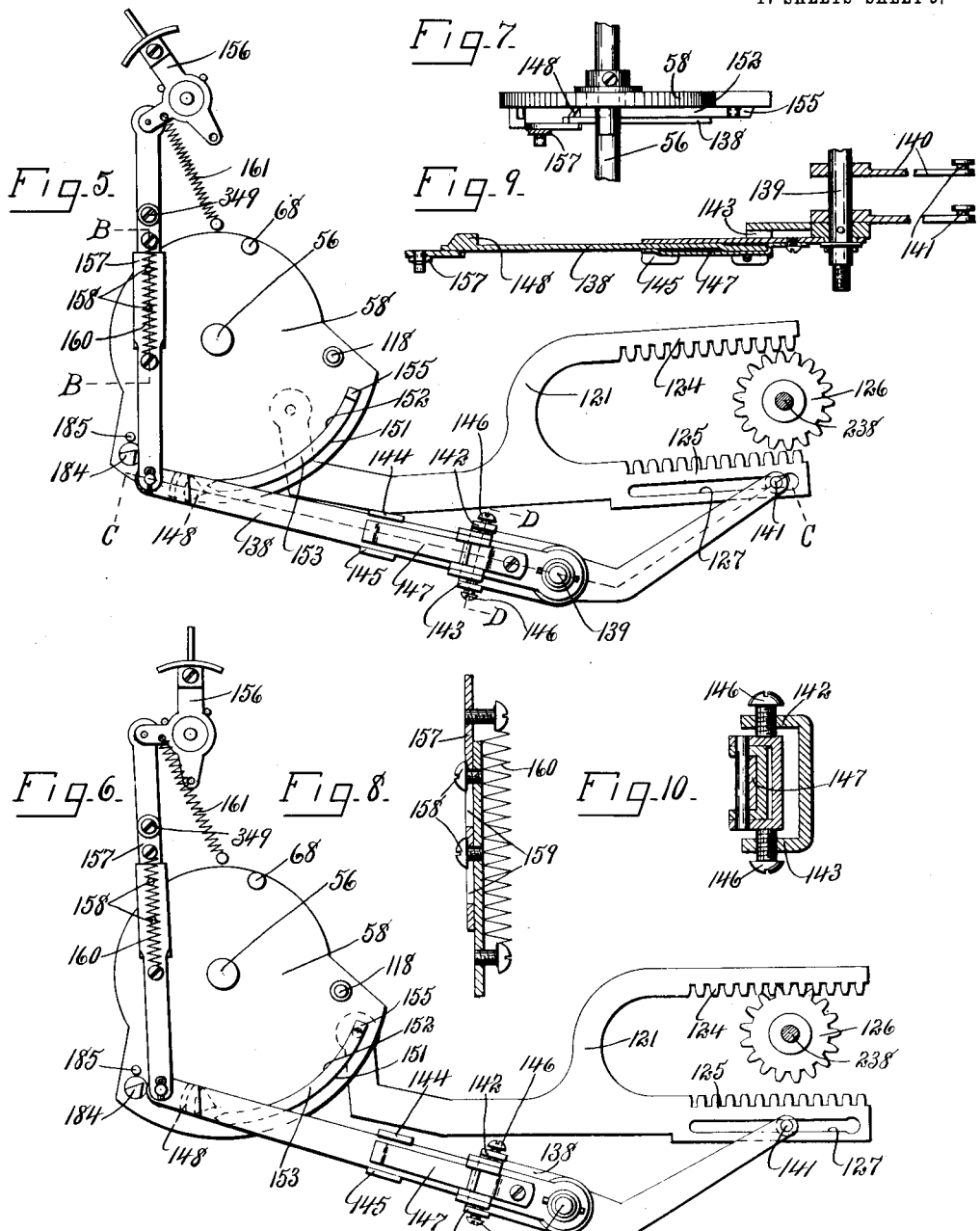

W. LE G. BUNDY.
CALCULATING MACHINE.
APPLICATION FILED SEPT. 22, 1905. RENEWED JAN. 19, 1911.
1,117,200.
Patented Nov. 17, 1914.
17 SHEETS—SHEET 6.
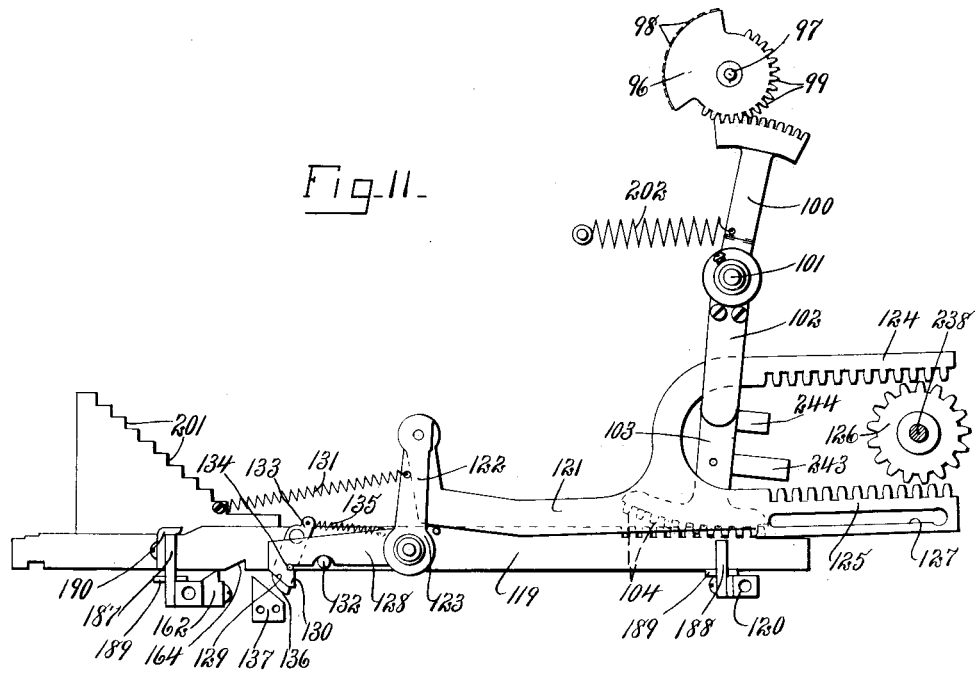
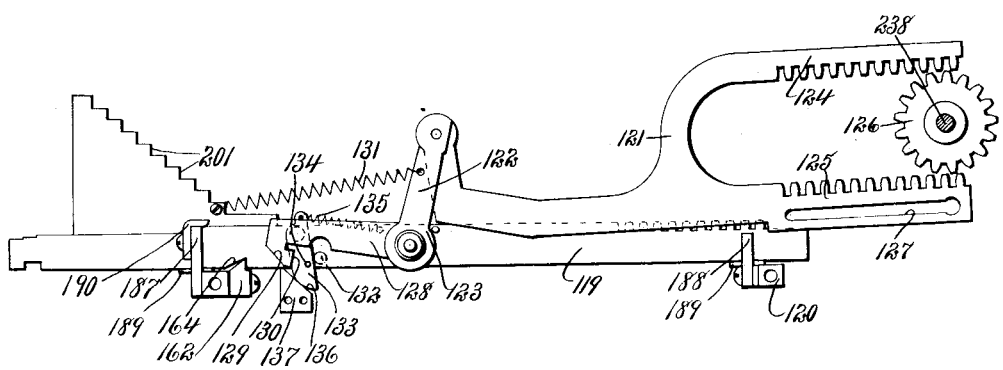
WITNESSES:
INVENTOR
Willard Le Grand Bundy
BY
Hey & Parsons
ATTORNEYS W. LE G. BUNDY.
CALCULATING MACHINE.
APPLICATION FILED SEPT. 22, 1905. RENEWED JAN. 19, 1911.

1,117,200.

Patented Nov. 17, 1914.
17 SHEETS—SHEET 7.

WITNESSES:
Chas. Jones,
Chas. H. Young.

INVENTOR
Willard Le Grand Bundy

BY
Hey & Parsons
ATTORNEYS

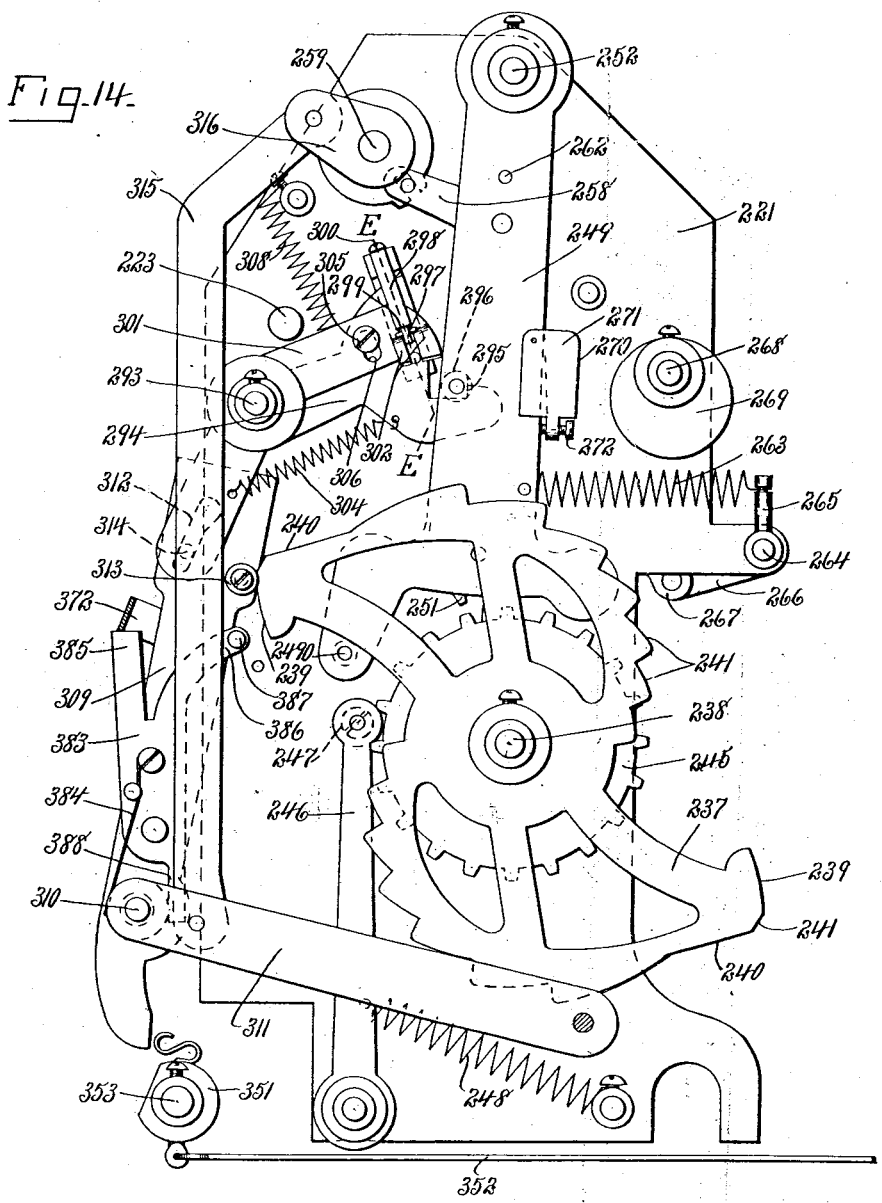

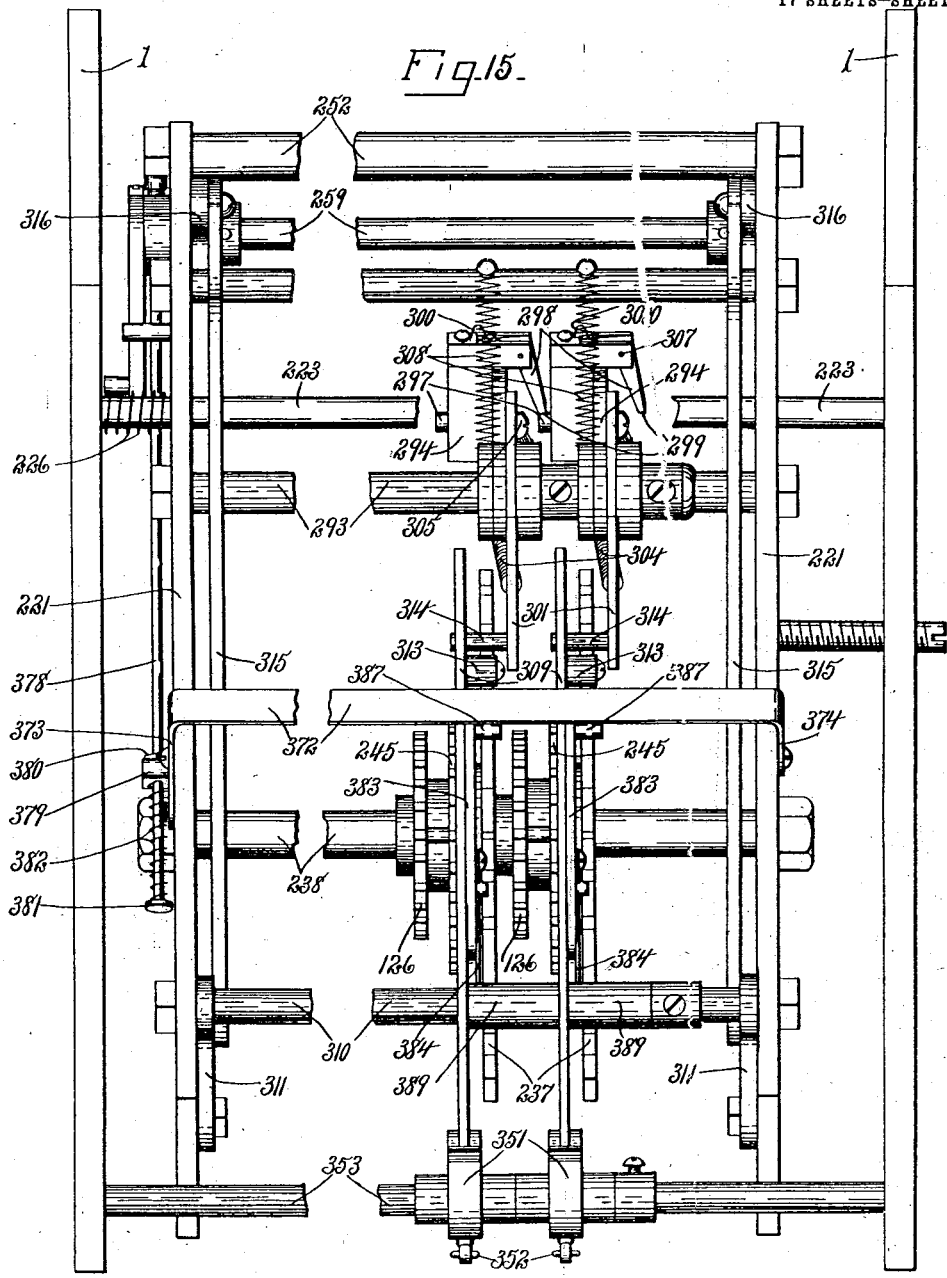

W. LE G. BUNDY.
CALCULATING MACHINE.
APPLICATION FILED SEPT. 22, 1905. RENEWED JAN. 19, 1911.
1,117,200.
Patented Nov. 17, 1914.
17 SHEETS—SHEET 10.
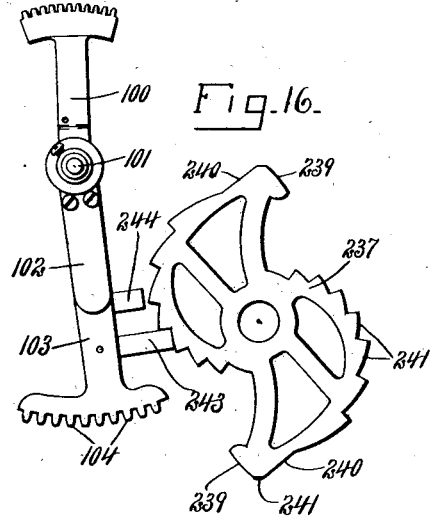
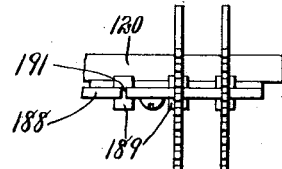
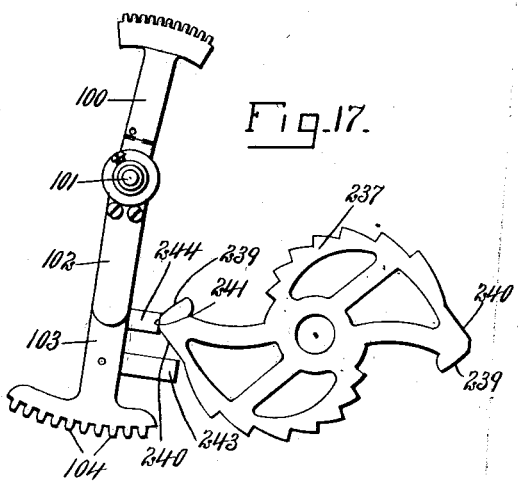
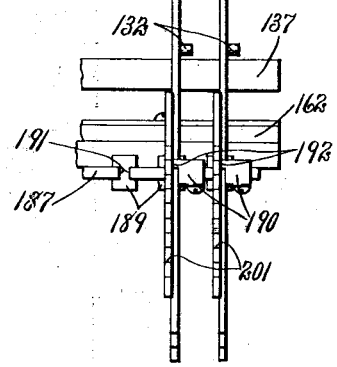
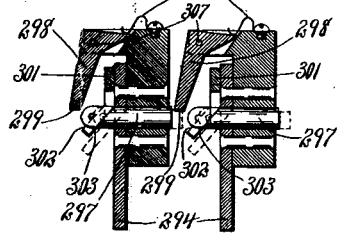
WITNESSES:
Chas. ~~Toner~~
Chas H Young
INVENTOR
Willard Le Grand Bundy
BY
Hey & Parsons
ATTORNEYS W. LE G. BUNDY.
CALCULATING MACHINE.
APPLICATION FILED SEPT. 22, 1905. RENEWED JAN. 19, 1911.
1,117,200.
Patented Nov. 17, 1914.
17 SHEETS—SHEET 11.
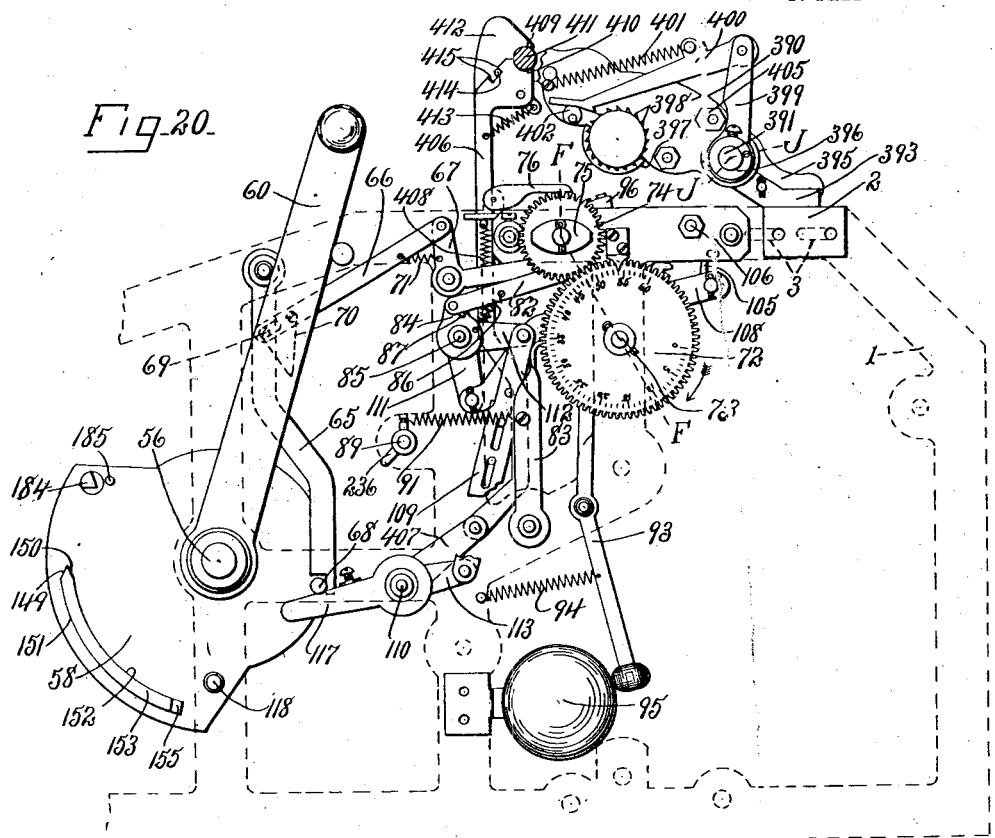
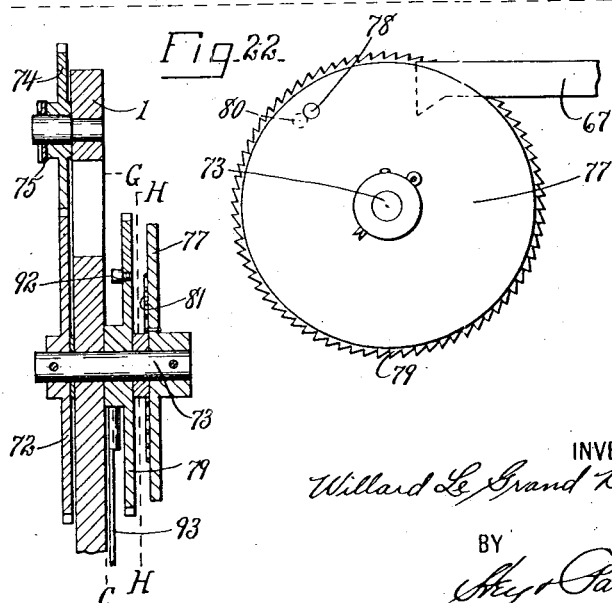
WITNESSES:
Chas. G. Jones.
Chas. H. Young.
INVENTOR
Willard Le Grand Bundy
BY
Key & Parsons
ATTORNEYS W. LE G. BUNDY.
CALCULATING MACHINE.
APPLICATION FILED SEPT. 22, 1905. RENEWED JAN. 19, 1911.

1,117,200.

Patented Nov. 17, 1914.
17 SHEETS—SHEET 12.

WITNESSES:
Chas. J. Toner.
Chas. H. Young.

INVENTOR
Willard Le Grand Bundy
BY
Sky & Parsons
ATTORNEYS

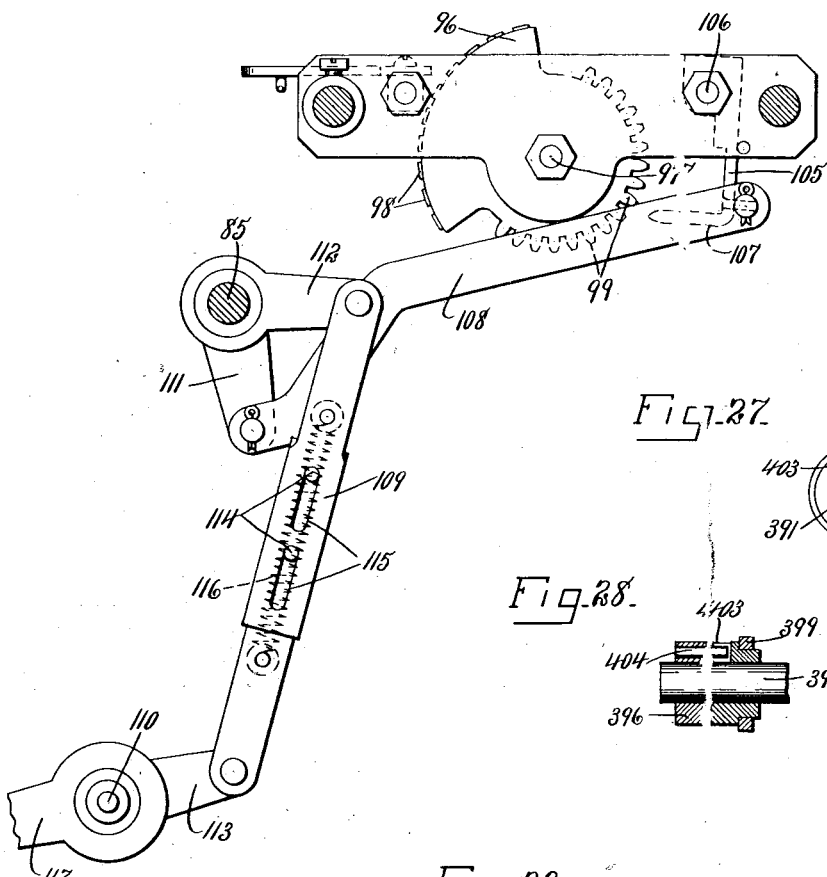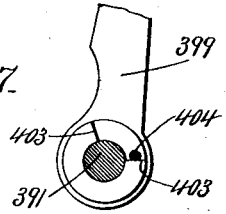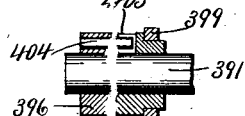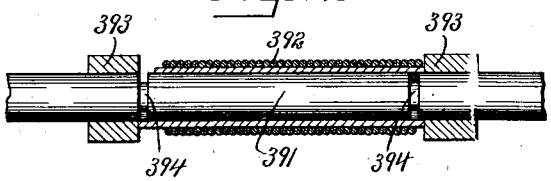

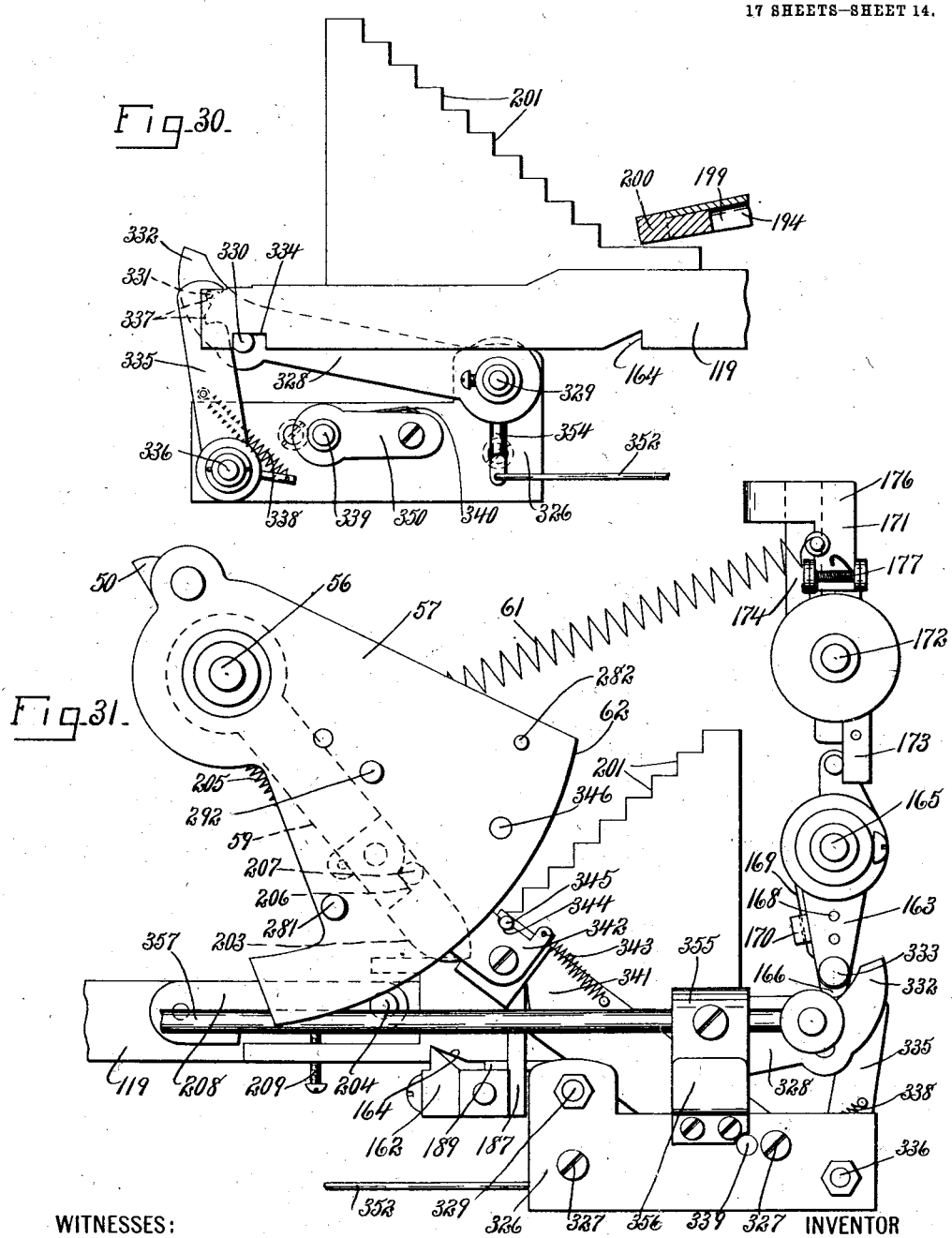

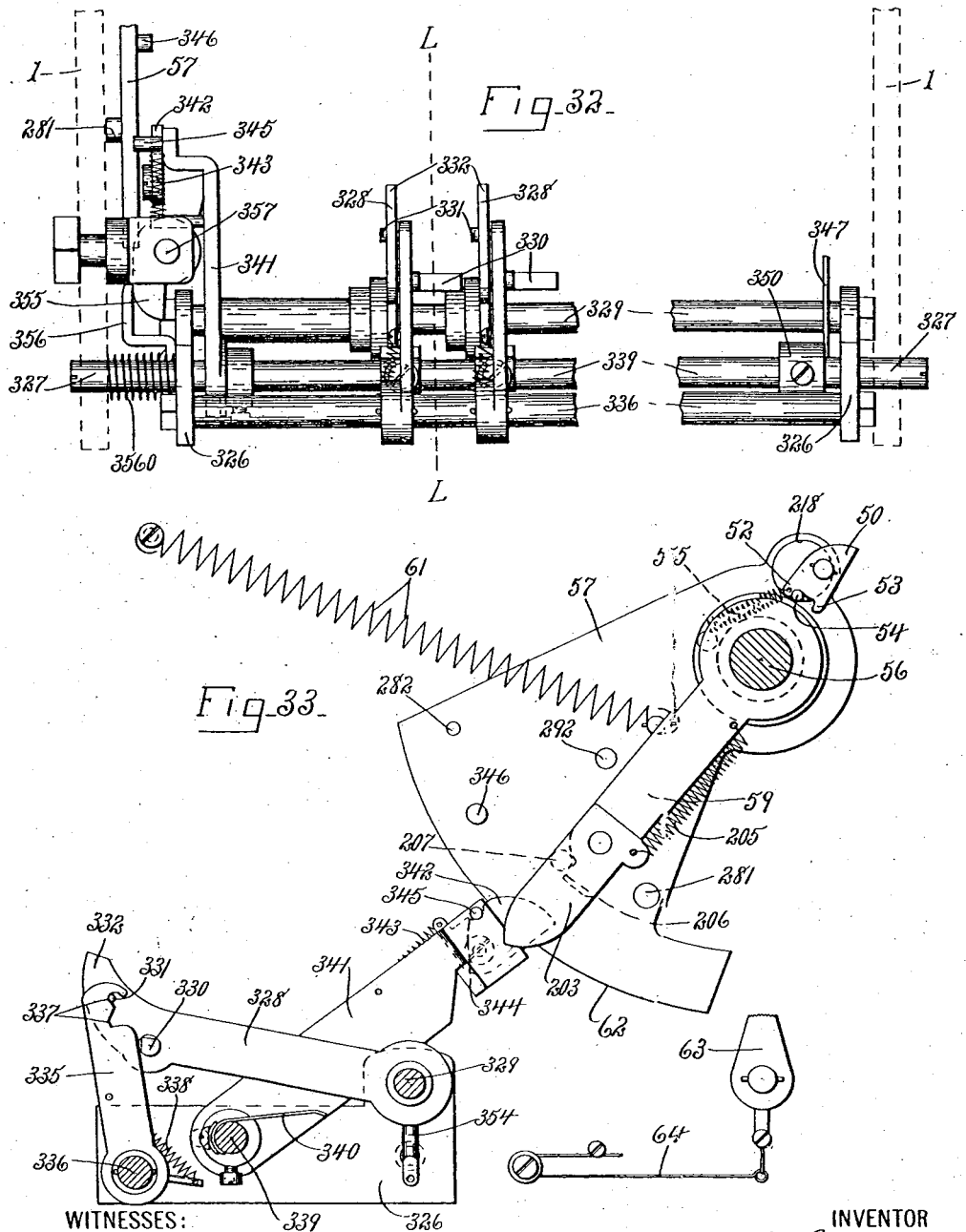

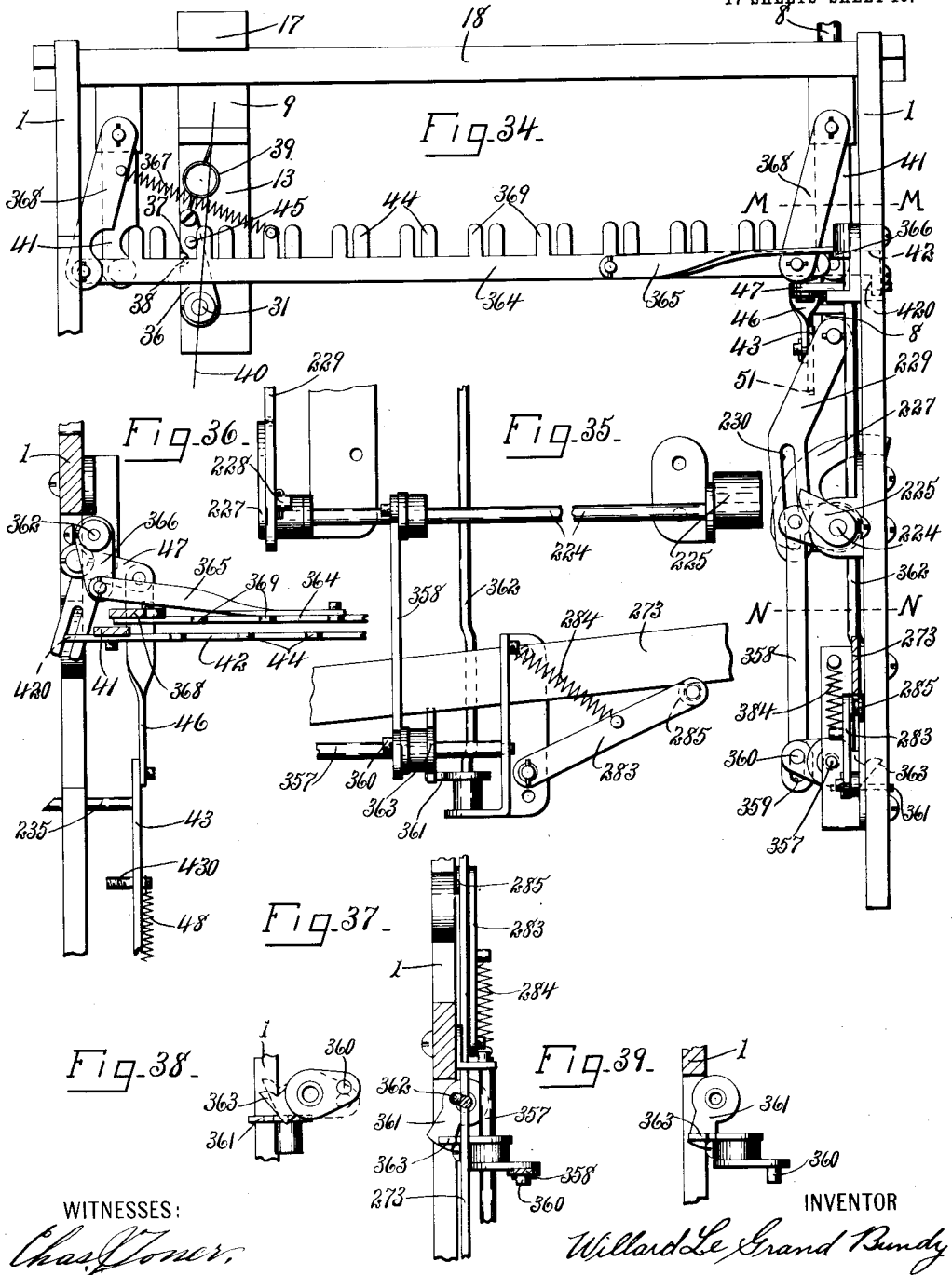

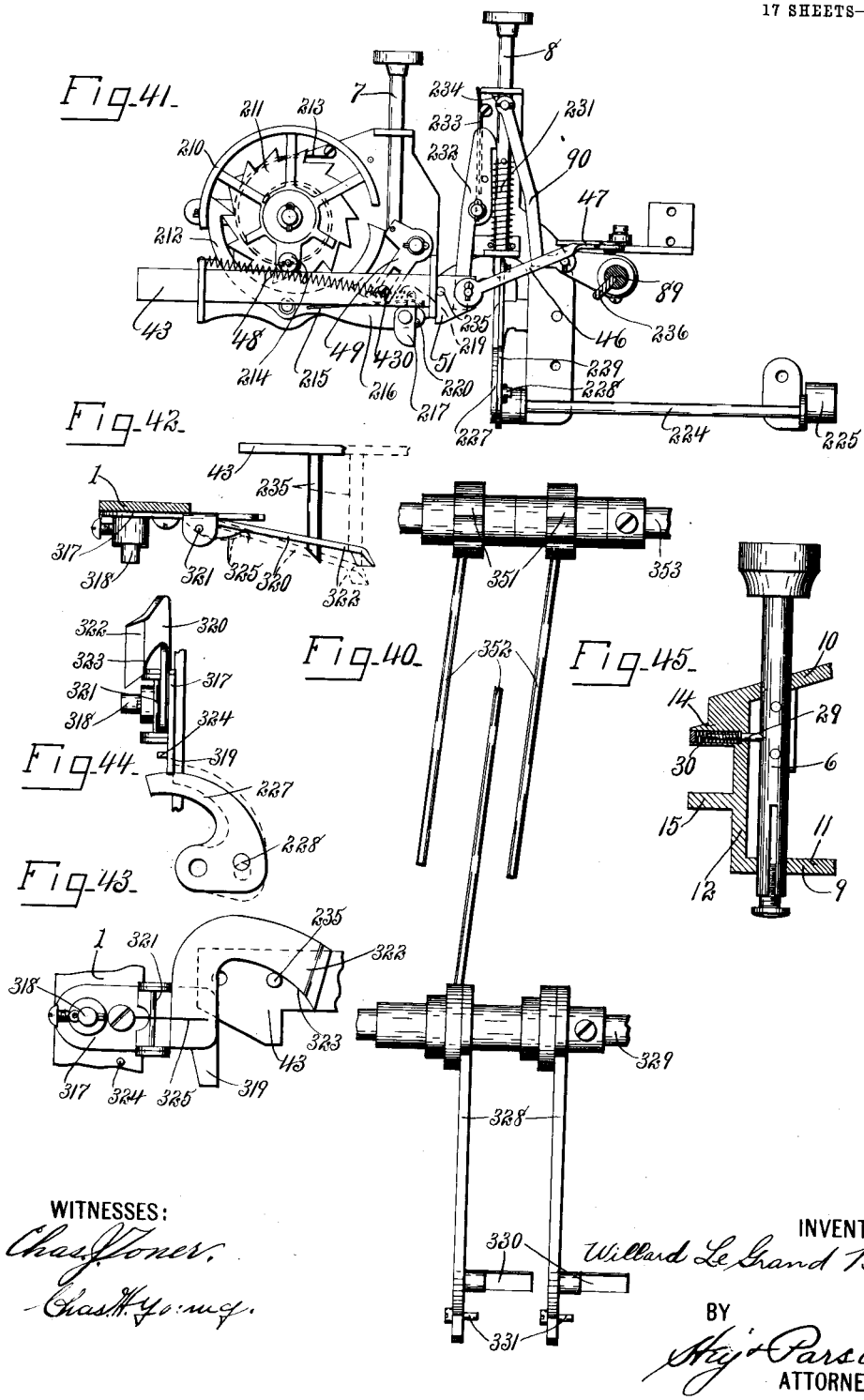

UNITED STATES PATENT OFFICE.

WILLARD LE GRAND BUNDY, OF SYRACUSE, NEW YORK, ASSIGNOR TO W. H. BUNDY RECORDING COMPANY, OF SYRACUSE, NEW YORK, A CORPORATION OF NEW YORK.

CALCULATING-MACHINE.

1,117,200.  Specification of Letters Patent.  Patented Nov. 17, 1914.

Application filed September 22, 1905, Serial No. 279,580. Renewed January 19, 1911. Serial No. 603,591.

*To all whom it may concern:*

Be it known that I, WILLARD LE GRAND BUNDY, of Syracuse, in the county of Onondaga and State of New York, have invented a certain new and useful Calculating-Machine, of which the following is a specification.

My invention has for its object the production of a calculating machine, which is particularly simple in construction and efficient in operation; and to this end, it consists in the novel combinations and devices hereinafter fully set forth and pointed out in the claims.

In describing this invention, reference is had to the accompanying drawing, in which like characters designate corresponding parts in all the views.

Figure 23:
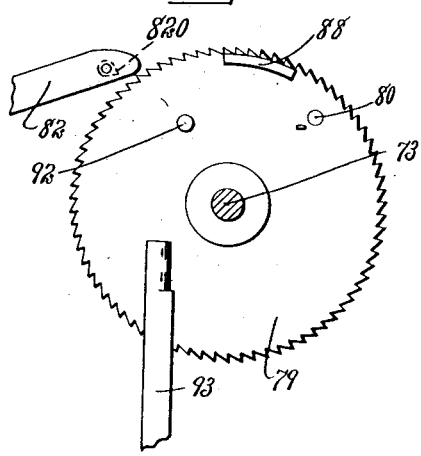
Figure 24:
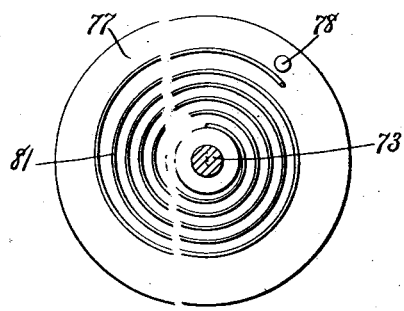
Figure 25:
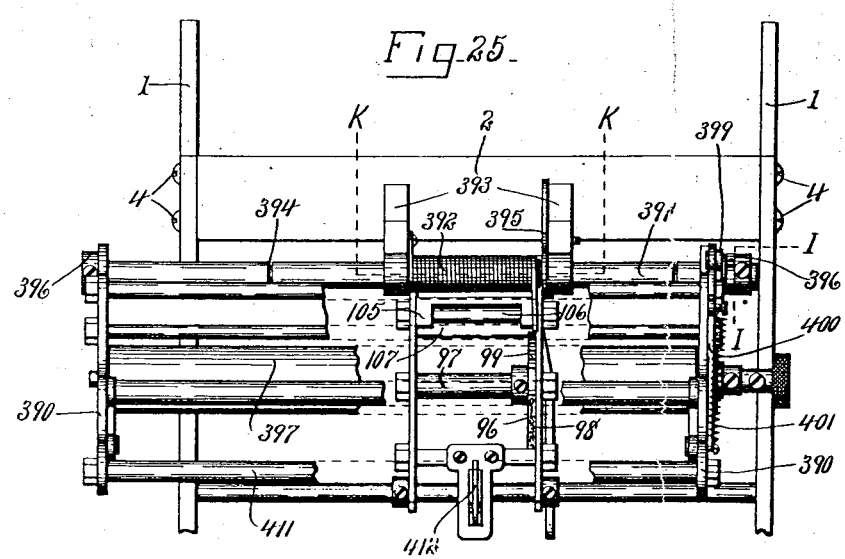

Figure 1 is a top plan illustrating the key board of my calculating machine. Fig. 1ª is a side elevation of one exemplification of my invention, the upright side of the frame being shown by dotted lines, and parts of the mechanism being omitted. Fig. 2 is an opposite side elevation of the machine, the frame being illustrated by dotted lines, and parts being omitted. Fig. 3 is a sectional view on line A—A, Fig. 1ª. Figs. 4, 5 and 6 are detail elevations, partly in section, of a portion of the calculating mechanism, one of the adding and subtracting power-transmitting elements coacting therewith, means for moving the free end of the power-transmitting element relatively to the calculating mechanism, and a portion of the actuating member. Fig. 4 also showing additional parts, and in dotted lines, the upright side of the frame. Fig. 7 is a plan view, partly in section, of a portion of the actuating member and coacting parts. Figs. 8, 9 and 10 are sectional views, respectively, on lines B—B, C—C, and D—D, Fig. 5. Figs. 11 and 12 are detail elevations, partly in section, of a portion of the calculating mechanism, one of the controlling members, an adding and subtracting power-transmitting element, and contiguous parts of the machine, a movable power-transmitting member, the spring connected to said member, and one of the recording members being also illustrated in Fig. 11. Figs. 13 and 14 are opposite side elevations, partly in section, of the calculating mechanism and contiguous portions of the machine, a side plate of the carriage for the calculating mechanism being removed in each view, and additional parts of the machine being also seen in Fig. 13. Fig. 15 is a rear elevation, partly broken away, of portions of the frame and the calculating mechanism, the carriage for said mechanism, and contiguous parts. Figs. 16 and 17 are detail views illustrating the coöperation of one of the calculating members and the corresponding power-transmitting member. Fig. 18 is a plan view, partly broken away, of a number of the controlling members, and the abutment, the stop, and the guides for said members. Fig. 19 is a sectional view, partly in elevation, on line E—E, Fig. 14. Fig. 20 is a side elevation, partly broken away, of a portion of the mechanism shown in Fig. 1. Fig. 21 is a sectional view, partly in elevation, on line F—F, Fig. 20. Fig. 22 is an inner face view of a number of the parts illustrated in Fig. 21. Figs. 23 and 24 are sectional views, partly in elevation, respectively, on lines G—G and H—H, Fig. 21. Fig. 25 is a plan view, partly broken away, of the support for the platen and contiguous parts of the machine. Fig. 26 is a side elevation, partly in section, of a recording member, the aliner, and contiguous parts. Figs. 27, 28 and 29 are sectional views, partly broken away and in elevation, respectively, on lines I—I, J—J and K—K, Figs. 20 and 25. Fig. 30 is a detail view of portions of one of the controlling members and the movable means coacting therewith, a locking member for the controlling member, the carriage for the locking member, and coöperating parts mounted on the carriage, a side plate of the carriage being removed. Fig. 31 is a detail elevation of portions of one of the controlling members and the actuating member, and contiguous parts. Fig. 32 is a face view, partly broken away, of a number of locking members for the controlling members, the carriage for said locking members, and contiguous parts, a portion of the frame being illustrated by dotted lines. Fig. 33 is a sectional view, partly in elevation, on line L—L, Fig. 32. Fig. 34 is a rear elevation, partly broken away and in section, of means for moving laterally the carriages for the calculating mechanism and locking members for the controlling members, one of the supplemental frames of the keyboard, the releasing means for said carriages and the keys, and contiguous parts of the machine. Fig. 35 is an inner face view, partly broken away, of a portion of the mechanism seen in Fig. 34. Figs. 36 and 37 are sectional views partly in elevation, on lines M—M and N—N, Fig. 34. Figs. 38 and 39 are, respectively, elevation and plan view of a portion of the frame and a part of the mechanism for temporarily restraining the return of the carriage which supports locking members for the controlling members. Fig. 40 is a detail plan view, of a number of locking members for the controlling members, and portions of the means connecting the calculating members with said locking members. Fig. 41 is a detail view, partly broken away and in section, of a number of the keys, the multiplying mechanism, and contiguous parts. Figs. 42 and 43 are, respectively, plan and side elevation of part of the frame, the means for temporarily preventing the return to its normal position of the carriage for the calculating mechanism, and a portion of the means for forcing the latter means from operative position. Fig. 44 is a front view of parts seen in Figs. 42 and 43, and a portion of the means for moving laterally the carriage for the calculating mechanism. Fig. 45 is a detail view of one of the keys, the stop therefor, and the contiguous part of the supplemental frame for supporting said key.

The illustrated exemplification of this invention comprises a frame, a key-board, an actuating member, means for automatically locking the actuating member after a predetermined number of operations thereof, recording and controlling members, and multiplying, calculating and printing mechanisms. It will be understood, however, that one or more of said devices may be dispensed with, if desired.

The frame 1 which is of any suitable form, size and construction, preferably comprises upright sides and a cross-bar 2, each upright side being provided with a plurality of lengthwise slots 3, Figs. 1 and 20, arranged one in advance of the other in horizontal alinement, and the cross-bar 2 being disposed between the upright sides and having its ends contiguous to the slots 3, and being adjustable lengthwise of said slots and held in position by screws 4, Fig. 25, passed through the slots 3 and into the ends of the cross-bar 2.

The key-board which is also of any desirable form, size and construction, usually consists of keys 5, 6, 7 and 8. Said keys 5 are arranged in series and are carried by supplemental frames 9 which extend side by side lengthwise of the front end of the frame 1, and each comprise top, bottom and end bars 10, 11, 12 and 13. Each supplemental frame 9 serves to carry a series of the keys 5 and is detachably secured to the frame 1, having one end thereof provided with opposing shoulders 14, 15, Fig. 1, for detachably engaging opposite surfaces of a cross-bar 16 of the frame 1, and its other end provided with a shoulder 17 for engaging the upper surface of a frame-cross-bar 18 opposed to the cross-bar 16, the shoulder 17 being detachably secured to the cross-bar 18 by any desirable clamping means, as the screw 19. The cross-bar 16 is provided with separated shoulders 20 which engage outer faces of the shoulders 14 of the right-hand and left-hand supplemental frames 9, and thus prevent lateral movement of the front ends of the frames 9 relatively to the frame 1.

As best seen in Figs. 1 and 3, each of the keys 5 is provided with a cylindrical shank 21 movable endwise in bearings in the top and bottom bars 10, 11 of the corresponding supplemental frame 9 and formed at its lower end with a lengthwise threaded socket split longitudinally, said socket receiving a lengthwise part 22 having one end threaded and adjustable endwise in the socket and its other end provided with an engaging face. These parts 22 form means adjustable relatively to the keys 5 for transmitting motion therefrom. Each cylindrical shank 21 is held in its elevated position by a spring 23, and is provided with means, as a sheet metal plate, detachably secured thereto and formed with a plurality of arms 24, 25, 26, 27, the arms 24, 25 extending parallel to the shank in opposite directions. The arms 24 coact with the top bars 10 of the supplemental frames 9 to limit the upward movement of the keys 5, and the lower ends of the arms 25 are separated from the shanks 21 and movable in guides 28 in the bottom bars 11 of said supplemental frames for preventing the rotation of the shanks 21. The arms 26, 27 project laterally from the shanks 21, are spaced a distance apart, and are moved successively into engagement with locking means carried by the supplemental frames 9. Each series of the keys 5, with the exception of the left-hand series, contains nine keys, each distinguished by one of the units 1 to 9, inclusive, said units being progressively arranged. The left-hand series contains eight of the keys 5, each being distinguished by suitable words, as notes, checks, drafts, etc.

The key 6, Fig. 45, is arranged in the left-hand series of the keys 5 in transverse alinement with the lowermost, or front, keys of the remaining series of the keys 5. Said key 6 is termed "ditto key," is provided with a cylindrical shank having a plurality of substantially V-shaped notches, and is held in either its elevated or depressed position by a yielding stop 29 movable endwise in a direction at substantially right angles to the line of movement of the key 6, and having one end supported in a socket in the left-hand supplemental frame 9 and engaged by a spring 30, and its other end pointed and adapted to enter the sockets of the shank of the key 6, and to be automatically forced out of said sockets by the tapering walls thereof as the key 6 is moved downwardly or upwardly.

In the illustrated construction of my invention, the locking means, Figs. 1 and 3, coacting with the arms 26, 27 of the keys 5, consists of a plurality of rock-shafts 31 journaled in the end bars 12, 13 of the supplemental frames 9, and pivoted locking members 32, one for each key 5, fixed in series on the rock-shafts 31. Each locking member 32 is formed with shoulders 33, 34 spaced apart, and arranged above and below the axis of the shaft 31 provided therewith, the upper shoulder 33 having a beveled engaging face 35. The rock-shafts 31 are provided with arms 36, Fig. 34, fixed thereto and formed with cutouts 37 which receive shoulders 38 carried by the end walls 13 of the supplemental frames 9. Springs 39 are pivotally supported at corresponding ends on the supplemental frames 9, and are pivoted at their other ends to the free or upper ends of the arms 36, the pivots for uniting contiguous ends of the arms 36 and the springs 39 being held by said springs on opposite sides of lines, as 40, drawn through the axes of the rock-shafts 31 and the springs 39. The movement of the rock-shafts in one direction is limited by the engagement of the walls of the cutouts 37 with the shoulders 38, and in the opposite direction by the engagement of the shoulders 34 of the locking members 32 with the bottom bars 11 of the supplemental frames 9.

If the operator depresses one of the keys 5 when the remaining keys of the series including said key are in their elevated position, the lower arm 27 on the key being depressed, will engage the shoulder 34 of the corresponding locking member 32 and force said member 32 into its operative position with its upper shoulder 33 engaged with the arm 26 of the depressed key for preventing the return movement thereof. When said locking member is forced into operative position, as described, it rocks the shaft 31 provided therewith, and thus simultaneously moves all of the other locking members 32 fixed to said rock-shaft 31, so that the beveled engaging faces 35 thereof will be in position to be engaged by the arms 26 of the remaining keys. Consequently, when one of the remaining keys is depressed, the arm 26 thereof will engage the beveled face 35 of the corresponding locking member 32 and reversely move the rock-shaft provided therewith and the remaining locking members thereon, and thus release the key first depressed. If the movement of the key last actuated is continued, the lower arm 27 thereof will engage the shoulder 34 of the corresponding locking-member and cause the same to assume its operative position and prevent the return of said key.

The locking members 32 are returned to their normal or inoperative position by any suitable means, here illustrated, Fig. 34, as comprising substantially parallel links 41, and longitudinally movable bars 42, 43, the links 41 having their upper ends pivoted at the sides of the machine, and the bar 42 being arranged crosswise of said machine and having its extremities pivotally supported on the lower ends of the links 41, and being provided with a series of upwardly extending shoulders 44 coöperating, respectively, with laterally extending shoulders 45 on the arms 36 of the rock-shafts 31. The bar 43 extends lengthwise of the frame at the left-hand side of the front thereof and at an angle to the bar 42. As best shown in Fig. 36, the rear end of the bar 43 is pivoted to the front end of a link 46 having its other end pivoted to one arm of a bell-crank lever 47 supported by the frame, and having its other arm formed with a lengthwise slot which receives a depending shoulder 420, Figs. 34 and 36, provided on one end of the bar 42. The bar 43 is held in its normal position by a spring 48 and is moved rearwardly against the action of said spring by the vertically reciprocating key 7, Fig. 41, or by means, Fig. 33, provided on the actuating member. As the bar 43 is moved rearwardly, the link 46 and the bell-crank lever 47 move the bar 42 to the right and rock from their operative position any of the locking members 32 previously forced to said operative position by the depression of the keys 5. As best seen in Fig. 41, the key 7 is connected to one arm of a bell-crank lever 49 having its other arm formed with a lengthwise slot which receives a shoulder 430, Figs. 36 and 41, on the outer face of the bar 43. The depression of the key 7 thus actuates the lever 49 to move the bar 43 against the action of the spring 48 for causing the link 46 and the lever 47 to move the bar 42 to the right.

The means provided on the actuating member for operating the bar 43 consists of a tappet 50, Figs. 2 and 33, pivoted to the actuating member and having an engaging end or shoulder for coacting with a shoulder 51, Fig. 41, fixed to the bar 43 and depending therefrom, and having additional engaging shoulders 52, 53, Fig. 33, which coact with a stop 54 carried by the actuating member. A spring 55 holds said tappet 50 in its normal position with the shoulder 52 in engagement with the stop 54. When the actuating member is rocked on its axis to force the engaging end of the tappet 50 forwardly, said end encounters the shoulder 51, and as the movement of the actuating member continues, the tappet is rocked on its axis relatively to the actuating member against the action of the spring 55, such movement of the tappet being limited by the engagement of the shoulder 53 with the stop 54. Upon the return movement of the actuating member, the engaging end of the tappet 50 encounters the shoulder 51, and since said tappet is prevented from movement relatively to the actuating member by the engagement of the shoulder 52 with the stop 54, the bar 43 is forced rearwardly and moves the bar 42 to the right. The continued movement of the actuating member forces the engaging end of the tappet 50 rearwardly out of contact with the shoulder 51, whereupon the spring 48 returns the bars 43, 42 to their normal position.

The actuating member preferably comprises an oscillating shaft 56, Figs. 20 and 33, journaled in the upright sides of the frame of the machine, segmental plates 57, 58 fixed to the shaft 56 between said upright sides, arms 59 for moving the controlling members toward their normal position, and a hand-piece 60 fixed to the right-hand end of the shaft 56 at the outer side of the frame. A suitable spring 61 is connected to the segmental plate 57 and serves to facilitate the initial part of the return movement of the actuating member. I preferably prevent the return of the actuating member after the same has commenced a movement in either direction until said movement has continued to substantially the limit thereof, the means for effecting this result being shown as consisting of an arc-shaped surface 62 provided on the plate 57 of the actuating member and formed of less length than the arc in which said surface 62 is movable, a pivoted pawl 63 projecting into the path of the arc-shaped surface 62 and normally arranged at one end of said surface, and a spring 64 for returning the pawl to its normal or upright position. When the actuating member is moved in either direction, the advancing end of the surface 62 engages the pawl 63 and rocks the same from its normal position against the action of the spring 64. The pawl 63 then prevents the reverse movement of the actuating member until after the surface 62 has passed beyond said pawl. As the actuating member reaches the limit of its movement in either direction, the surface 62 passes beyond the pawl 63, whereupon the spring 64 rocks the pawl 63 to its normal or upright position, after which the actuating member is free to move in the reverse direction.

The means, Fig. 20, for automatically locking the actuating member after a predetermined number of operations thereof, comprises a stop-arm 65, power-transmitting means, as a link 66 and a lever 67, and adjustable means coacting with said lever for actuating the same and forcing the stop-arm into operative position after a predetermined number of operations of the actuating member. The stop-arm 65 is pivoted at its upper end to the frame 1, and is formed at its lower end with a notch which, when the stop-arm is in operative position, receives a shoulder 68 provided on the actuating member and prevents the movement of said member from its normal position. The front end of the link 66 is provided with a lengthwise slot which receives a laterally projecting pin or shoulder 69 provided on the stop-arm 65, and said end of the link 66 is connected to the stop-arm by a spring 70 which permits the stop-arm to move relatively to said link. The lever 67 is pivoted to the frame 1 and to the rear end of the link 66, and is held in its normal position by a spring 71.

The adjustable means coacting with the lever 67 for actuating the stop-arm 65 after a predetermined number of operations of the actuating member, comprises a pinion 72, Figs. 20 and 21, fixed to a shaft 73; a pinion 74 for moving the pinion 72 and holding the same in its adjusted position; a friction-device, as a spring-washer 75, for preventing undue movement of the pinion 74; a pawl 76 for preventing retrograde movement of the pinion 74; a disk 77, Fig. 21, fixed to the shafts 73 and provided with a stop-shoulder 78, Figs. 22 and 24; a ratchet-wheel 79 loosely mounted on the shaft 73 and provided with a laterally projecting shoulder 80, Figs. 22 and 23, coöperating with the stop-shoulder 78 on the disk 77 for limiting the movement of the ratchet-wheel 79 in one direction relatively to the pinion 72 and the disk 77; a spiral spring 81 connected to the disk 77 and the ratchet-wheel 79 for returning said ratchet-wheel to its normal position; means, as a feeding pawl 82, for moving the ratchet-wheel 79 step by step relatively to the disk 77; and means, as a pawl 83, Fig. 20, for preventing retrograde movement of said ratchet-wheel. The shoulder 80 on the ratchet-wheel 79 encounters the free end of the lever 67 during the advance movement of said ratchet-wheel in the direction indicated by the arrow, Fig. 20, and by raising the free end of said lever rocks the stop-arm 65 into its operative position.

As best seen in Fig. 20, the feeding pawl 82 is pivoted at its front end to an arm 84, which is provided on a rock-shaft 85 connected to the actuating member, the free end of said feeding pawl 82 being drawn downwardly by a spring 86 and provided with a single shoulder 820, Fig. 23, which coacts with the teeth of the ratchet-wheel 79 for advancing the same a single step upon each operation of the rock-shaft 85. A shoulder 87 is provided on the arm 84 and normally engages the feeding pawl 82 for holding said pawl out of engagement with the teeth of the ratchet-wheel 79, until the end of the movement of the rock-shaft 85, so that the ratchet-wheel 79 is fed but a single tooth at a time. When the ratchet-wheel 79 is in its initial position, as illustrated in Fig. 1, the free end of the feeding pawl 82 is preferably engaged by a shoulder 88 which projects from the side of the ratchet-wheel opposite to that provided with the shoulder 80 and coöperates with the feeding pawl 82 to hold the shoulder 820 out of engagement with the teeth of the ratchet-wheel. Consequently, when the ratchet-wheel 79 is in its initial position, no movement thereof takes place upon the operation of the rock-shaft 85. The pawl 83 may be withdrawn from its operative position by any suitable means, here illustrated as comprising the key 8, Fig. 41, a rock-shaft 89 connected to said key by any desirable means, as a link 90, and means, as a spring 91, Fig. 20, connecting the rock-shaft 89 to the pawl 83, said spring 91 permitting the pawl 83 to yield relatively to the key 8.

When adjusting the means for automatically locking the actuating member, the operator engages and rotates the pinion 74, and thereby rotates the pinion 72, the disk 77 and the ratchet-wheel 79 from their initial position, a sufficient distance so that the predetermined number of operations of the actuating member will cause the ratchet-wheel 79 and the parts revoluble therewith to advance step by step relatively to the pinion 72 the requisite distance to engage the shoulder 80 with the lever 67 and force the stop-arm 65 into position to prevent further operation of the actuating member. After the operator has adjusted the pinions 72, 74, he moves the upper end of the handpiece 60 forwardly, thus causing the operation of the rock-shaft 85 and the feeding pawl 82 for advancing the ratchet-wheel 79 relatively to the pinion 72 and the disk 77 and separating the shoulders 78, 80. As the ratchet-wheel reaches the limit of its predetermined movement, the shoulder 80 thereon engages the rear end of the lever 67, and by means of the link 66 and the spring 70 forces the free end of the stop-arm 65 into position to receive in the notch therein, the shoulder 68 on the actuating member and prevent further operation of said member. When the upper end of the handpiece 60 swings rearwardly after the stop-arm has been forced to its operative position, the shoulder 68 engages the front face of the lower end of said stop-arm above the notch therein and rocks the same backwardly against the action of the spring 70, but as soon as the shoulder 68 passes into alinement with said notch, the spring 70 moves the stop-arm to its operative position. Just before the stop-arm 65 is forced to its operative position, a shoulder 92 provided on the ratchet-wheel 79 encounters the upper end of a hammer 93 which is pivoted intermediate of its ends to the frame of the machine on an axis substantially parallel to the shaft 73, and is connected to a spring 94 for engaging the lower end of said hammer with a bell or alarm 95, in order to inform the operator that the actuating member is about to be locked from further movement. The upper end of the hammer 93 yields laterally in a direction substantially parallel to the pivot of said hammer, in order to permit the shoulder 92 to pass the upper end of the hammer as the ratchet-wheel 79 returns to its normal position.

As illustrated in Figs. 11 and 26, the recording members 96 consist of rocking parts loosely mounted side by side on a shaft 97, and having their upper surfaces provided with suitable indicating characters 98, and their lower portions formed with teeth 99. The recording members 96 are rocked to and fro on the shaft 97 by any desirable power-transmitting members 100, Fig. 11, loosely mounted on a shaft 101, and having their upper ends arranged in close proximity to each other and provided with teeth engaging the teeth 99, and their lower ends provided with arms 102, 103 spaced apart, the arms 103 extending beneath the arms 102 and having their lower edges provided with teeth 104 engaging like teeth on the controlling members.

A suitable aliner 105, Fig. 26, coacts with the recording members 96 just before the operation of the printing mechanism, in order to effect the desired alinement of the characters 98 in the printing field. This aliner is here shown, as pivoted at its upper end on a shaft 106, and as having its lower end provided with an angularly arranged portion 107 formed with a tapered edge for alining the recording members by entering the spaces between the teeth 99 after the recording members are set by the power-transmitting members 100. Any desired means may be used for operating the aliner 105, as links 108, 109 and the rock-shafts 85, 110. The link 108 extends substantially lengthwise of the frame 1, its rear end being pivoted to the lower end of the aliner 105, and its front end being pivoted to an arm 111 on the rock-shaft 85. Said link 109 is preferably arranged in an upright plane and consists of sections movable endwise relatively to each other, the upper section being pivoted at its upper end to an arm 112 on the rock-shaft 85, and the lower section being pivoted at its lower end to an arm 113 on the rock-shaft 110. The other ends of the sections of the link 109 are lapped upon each other and are provided with shoulders, here illustrated as pins 114 and the end walls of slots 115, which limit the movement of the sections of the link 109 relatively to each other. A spring 116 yieldingly holds the pins 114 in engagement with the upper end walls of the slots 115. The rock-shaft 110 is provided with a forwardly extending arm 117 which is engaged by a pin or shoulder 118, Fig. 20, on the actuating member as the free end of the hand-piece 60 reaches the limit of its forward movement. During the movement of the rock-shaft 110 by the actuating member, the spring 116 yields slightly after the tapered edge of the aliner 105 encounters the end surfaces of the spaces between the teeth 99 of the recording members, and said spring yields to a greater extent providing the aliner encounters a tooth 99 instead of entering the space contiguous to said tooth.

The controlling members 119, Figs. 1, 11, 12 and 18, govern the setting of the recording members 96 and the operation of the calculating members, and as generally constructed, consist of rectilinearly reciprocating bars arranged side by side lengthwise of the frame 1, one controlling member being provided for each series of keys 5. Corresponding ends of the controlling members are pivotally supported on a cross-bar 120, and are provided with teeth normally meshing with the teeth 104 of the power-transmitting members 100, for causing said power-transmitting members and the recording members to move to and fro with the controlling members. The opposite ends of the controlling members 119 coöperate with means for preventing the movement of the controlling members from their normal position, means for limiting such movement, and means for moving the members 119 from and toward their normal position.

In the illustrated exemplification of my invention, the controlling members 119 govern the operation of the calculating members through the medium of power-transmitting elements 121, which are pivoted at their front ends to the upwardly extending arms 122 of bell-crank levers 123 pivoted to the controlling members 119 intermediate of the ends thereof, and are provided at their rear ends with opposing toothed parts or arms 124, 125 for coacting with opposite surfaces of toothed wheels 126 of the calculating mechanism, the arms 124 being guided between the arms 102, 103 of the power-transmitting members 100, and the arms 125 being formed with lengthwise slots 127. The bell-crank levers 123 are provided with horizontal forwardly extending arms 128 having the lower portions of their front faces formed with engaging surfaces 129 extending downwardly and rearwardly, and having rear faces 130 provided with notches. Suitable springs 131 move the forwardly extending arms 128 of the bell-crank levers 123 into engagement with any desirable stops, as pins 132 on the controlling members. Catches 133 are pivoted to the controlling members 119 and are provided with shoulders 134 which are forced into the notches in the faces 130, by springs 135. The lower portions of the front faces of said catches 133 are provided with engaging surfaces 136 extending downwardly and rearwardly and arranged in advance of the engaging surfaces 129. A suitable abutment 137 is arranged in position to be engaged by the surfaces 136, 129, and serves to successively force from their operative position the catches 133 and the levers 123 when the controlling members are being returned to their normal position.

The power-transmitting elements 121 are moved lengthwise of the frame with the controlling members 119 during the greater part of the travel of these members 119, but do not move with the controlling members during the initial movement of said members from their normal position and the final movement thereof to said position. When the controlling members are in their normal position, the abutment 137 holds the bell-crank levers 123 and the catches 133 against the action of the springs 131, 135 in the position, Fig. 12, relatively to the controlling members, to which the abutment has previously forced said levers and catches. Consequently, when the controlling members move from their normal position, the power-transmitting elements 121 do not move therewith until the springs 131, 135 have returned the levers 123 and the catches 133 to their position, relatively to the controlling members, illustrated in Fig. 11. Upon the return of the controlling members to their normal position, the power-transmitting elements 121 move therewith until the surfaces 136, 129 encounter the abutment 137, whereupon the controlling members 119 move forwardly independently of the power-transmitting elements 121. The independent forward movement of each controlling member takes place after the catch carried thereby has been forced from its operative position, and during said movement the abutment 137 engaging the surface 129 of the bell-crank lever 123 movable with said controlling member, rocks the upper end of the arm 122 of such bell-crank lever 123 backwardly sufficiently so that the power-transmitting element 121 connected to this lever 123 does not partake of the final forward movement of said controlling member. As will be understood by those skilled in the art, the initial movement of the controlling members from their normal position independently of the power-transmitting elements 121, permits the controlling members to move the recording members to bring the ciphers to the printing field without causing any movement of the toothed wheels 126 of the calculating mechanism by the elements 121.

The power-transmitting elements 121 are rocked on their pivots relatively to the controlling members 119 to engage the arm 124. 125 with the wheels 126, the means for rocking said members preferably consisting of a lever 138, Fig. 4, a rock-shaft 139, and arms 140, Fig. 9, projecting rearwardly from the shaft 139, the lever 138 being fixed intermediate of its ends to the shaft 139. The rear arm of the lever 138 and the arms 140 are provided with shoulders 141 movable in the slots 127 of the power-transmitting elements 121. The front arm of the lever 138 consists of a main section having its front end provided with upper and lower shoulders 142, 143; an intermediate section extending between the shoulders 142, 143, and adjustable about the rock-shaft 139 relatively to the main section, and provided with upper and lower shoulders 144, 145; screws 146 carried by the shoulders 142, 143 for adjusting the intermediate section; a front or end section connected by a substantially upright pivot to the intermediate section and extending between and forwardly beyond the shoulders 144, 145, and being movable laterally relatively thereto; and a spring 147 carried by the intermediate section and engaging the front or end section. A shoulder 148 is provided on the front end section of the lever 138 and coacts with faces 149, 150, 151, 152 and 153 of a cam-shoulder provided on the actuating member. The faces 149, 150 diverge rearwardly from their front ends, being both arranged at an angle to a line 154, Fig. 4, drawn radially through the junction of said faces and the axis of the actuating member. Said faces 151, 152 are substantially arc-shaped and extend from the outer portions of the faces 149, 150. The face 153 is concentric with the faces 151, 152, is arranged between said faces 151, 152 and terminates at its end opposite to the diverging faces 149, 150 in an inclined surface 155.

A hand-piece 156 is preferably connected to the lever 138 by any suitable means, as a link 157 of the same construction as the link 109, and including sections movable endwise relatively to each other and provided with shoulders, here shown as pins 158 and the end walls of slots 159, Fig. 8, which limit the movement of said sections relatively to each other. The link 157 also includes a spring 160 for yieldingly holding said sections in their normal position, with the pins 158 in engagement with the upper end walls of the slots 159. A spring 161 holds the hand-piece 156 in its position assumed, Figs. 4 and 5, when the machine is used for addition.

In the operation of the machine, as the free end of the hand-piece 60 moves forwardly from its normal position, the shoulder 148 is engaged by the surface 155 and the face 153 of the cam-shoulder on the actuating member, the front end section of the lever 138 moving laterally against the action of the spring 147 as the surface 155 engages said shoulder. Upon the return movement of said hand-piece 60, providing the hand-piece 156 is in the position illustrated in Figs. 4 and 5, the face 149 engages the shoulder 148 and moves the lower section of the link 157 and the front end of the lever 138 downwardly against the action of the spring 160, and the face 151 engages said shoulder 148 and holds the same in its depressed position. When the shoulder 148 moves downwardly, the rear arm of the lever 138 and the arms 140 move upwardly and force the arms 125 into engagement with the toothed wheels 126. During the engagement of the shoulder 148 and the face 151, the controlling members 119 are returned to their normal position and the lever 138 is prevented from movement and holds the arms 125 in engagement with the wheels 126, thus operating the calculating mechanism to add the amount for which the machine was set prior to the movement of the free end of the hand-piece 60 forwardly. As soon as the face 151 passes beyond the shoulder 148, the spring 160 returns the lower section of the link 157 and the lever 138 to their normal position, thus disengaging the arms 125, of the power-transmitting elements 121 from the wheels 126. If it is desired to use the machine for subtraction, the hand-piece 156 is forced to its position shown in Fig. 6 just before the rearward movement of the free end of the hand-piece 60, thus raising the shoulder 148 which, upon the return movement of the hand-piece 60, will then be engaged by the faces 150, 152 and will actuate the lever 138 to engage the arms 124 with the wheels 126. As soon as the face 152 passes beyond the shoulder 148, the spring 161 returns the hand-piece 156 and reversely moves the lever 138 and disengages the arms 124 from the wheels 126.

As generally constructed, the means for preventing the movement of the controlling members 119 from their normal position, comprises a fixed stop 162, locking members 163, Figs. 1 and 31, and also devices which hold the controlling members from movement during the operation of recording the total. The stop 162 normally enters notches 164 in the lower edges of the controlling members 119, and when the controlling members are withdrawn from their normal position, the stop 162 engages the portions of said lower edges in front of the notches 164 and elevates the front ends of the controlling members, thus moving said front ends in a plane disposed at substantially a right angle to the plane of the longitudinal movement of the controlling members. The locking members 163 comprise main sections loosely mounted on a shaft 165, and movable sections 166 pivoted to the main sections and provided with shoulders 167 which are held in engagement with shoulders 168, Fig. 1, on the main sections by springs 169 having corresponding ends engaged with the sections 166 and their other ends suitably connected to the shaft 165. Said sections 166 engage the controlling members 119 for holding the same in their normal position, are prevented from movement beyond their normal position in one direction relatively to the main sections of the members 163 by the shoulders 167, 168, and are movable from their normal position in the opposite direction relatively to said main sections against the action of the springs 169 for permitting the return of the controlling members to their normal position. Each locking member 163, with the exception of the two corresponding to the left and right-hand series of keys 5, 6, is provided with an arm 170 which projects laterally from the right-hand side thereof into engagement with the inner or rear face of the adjacent member 163. When one of the locking members 163 provided with an arm 170 is rocked from its operative position, the arm 170 thereof will rock the adjacent locking member at the right from its operative position, in order to allow the recording member corresponding to said adjacent locking member to aline a cipher in the printing field.

The locking members 163 are preferably forced from their normal or operative position by independently operating power-transmitting devices 171, Fig. 31, each consisting of a rocking section loosely mounted on a rock-shaft 172 and having an arm 173 engaged with one of the members 163, and a second rocking section fixed to the rock-shaft 172 and having an arm 174. The rocking sections loosely mounted on the shaft 172 are held in their normal position by springs 175, Figs. 1 and 4, and are provided with arms 176 which serve to connect together the rocking sections of the power-transmitting devices, the upper ends of the arms 176 being movable laterally into engagement with the arms 174 by springs 177 carried by said sections loosely mounted on the rock-shaft 172. When said arms 176, 174 are engaged with each other, motion will be transmitted from the sections fixed to the rock-shaft 172 and provided with the arms 174 to said sections loosely mounted on the rock-shaft 172 and carrying the arms 176.

The rock-shaft 172 is usually provided with a rock-arm 178, Fig. 1, connected to a spring 179 for normally holding said arm against a stop 180 provided on the frame 1.

An engaging arm 181 is pivoted at its front end to the arm 178 intermediate of the ends of said arm 178, and the rear end of said arm 181 is provided with a shoulder 182, and a lengthwise face 183 extending rearwardly and upwardly from such shoulder. Said shoulder 182 and face 183 are engaged by a plurality of shoulders 184, 185 which are provided on the actuating member and arranged out of radial alinement with each other, the shoulder 184 being normally engaged with the shoulder 182 and the face 183, and the shoulder 185 being nearer the axis of the actuating member than the shoulder 184 and normally separated from the face 183. A suitable spring 186 tends to rock downwardly the free end of the engaging arm 181. Immediately upon the forward movement of the free end of the hand-piece 60, the shoulder 184 forces the engaging arm 181 endwise and rocks the shaft 172, and also rocks any of the sections of the power-transmitting devices 171 loosely mounted on said shaft and having their arms 176 connected to the arms 174 of the sections fixed to the shaft 172, thereby actuating the locking members 163 of the corresponding controlling members 119 to release said controlling members. As the free end of the hand-piece 60 continues its forward movement, the shoulder 185 engages the face 183 of the arms 181 and facilitates the disengagement of the shoulders 182, 184 to permit the return movement of the shaft 172 by the spring 179. Said controlling members 119 are guided in their upward or pivotal and longitudinal movement by any suitable means, here illustrated, Figs. 11, 12 and 18, as comprising plates 187, 188, wearing parts 189, and members 190. The plates 187, 188 are secured, respectively, to the stop 162 and the cross-bar 120, and are provided with a plurality of cutouts 191, Fig. 18, extending downwardly through their upper edges for receiving the controlling members, surfaces of the cutouts engaging surfaces of the controlling members. The wearing parts 189, are removably secured in position in the inner or lower ends of the cutouts 191 and engage the lower edges of the controlling members 119. It will be understood that these parts 189 upon being worn out may readily be removed and others substituted. Said members 190 are detachably fixed to the plate 187 at corresponding sides of the cutouts 191, and are provided with lateral projections 192 for engaging the upper edges of the controlling members and limiting the upward movement of the front ends thereof. The projections 192 are normally separated from the upper edges of the controlling members 119 a sufficient distance to permit the upward movement of the front ends of said controlling members.

As preferably constructed, the means for limiting the movement of the controlling members 119, Figs. 1 and 30, usually consists of movable means, as bell-crank levers 193, 194, between the keys 5, 6 and the controlling members, said levers being movable relatively to the controlling members into a plurality of positions, one lever 193 being provided for each series of keys, and one lever 194 for each controlling member. Each bell-crank lever 193 consists of a section 195 pivoted at one end of the corresponding series of keys and provided with diverging arms, one extending forwardly and the other downwardly, and a second section 196, Fig. 3, of inverted U-shaped cross-section having its rear end fitted over and secured to the forwardly extending arm of the section 195, said section 196 being arranged in a horizontal plane directly beneath and in the paths of the lower ends of one of said series of keys. The free ends of the sections or arms 196 are provided at one side thereof with upturned engaging portions 197, normally coacting with rearwardly extending parts of the arms 176 of the power-transmitting devices 171 for forcing the upper ends of the arms 176 laterally against the action of the springs 177 and holding said arms 176 out of position to be engaged by the arms 174 when rocked by the actuating member. As soon as one of the levers 193 is rocked from its normal position, by the depression of one of the keys 5, 6, the portion 197 of such lever 193 passes beneath said rearwardly extending part of the arm 176 of the corresponding power-transmitting device 171, whereupon the spring 177 connected to this arm 176 forces the upper end of said arm 176 laterally into its operative position in engagement with the arm 174 of said power-transmitting device. Each bell-crank lever 194 consists of a section 198 pivoted at one end of the corresponding series of keys and provided with diverging arms, one extending forwardly and the other upwardly, and a second section 199 of inverted U-shaped cross-section having its rear end fitted over and secured to the forwardly extending arm of the section 198. The upwardly projecting arms of the sections 198 are formed with teeth meshing with similar teeth on the depending arms of the sections 195. Said sections 199 are provided with engaging parts 200, Fig. 30, which are fixed within the channels of their free ends, project forwardly from said channels, and coact with a plurality of series of shoulders 201 formed on the controlling members 119, and arranged in steps, one below and in advance of the other, and also arranged in front of the pivots for the levers 194.

The engaging parts 200 are normally separated from the lowermost shoulders 201 to permit the controlling members, when released, to make a single advance, whereupon further movement thereof will be prevented by these engaging parts. Said single advance of the controlling members 119 is permitted when the locking members 163 for holding the same in their normal position are forced from operative position by means of the arms 170 provided on the next adjacent locking members to the left. When one of the keys 5, 6 is depressed, the movement of the corresponding lever 193 elevates the forwardly extending arm of the lever 194 coöperating therewith and alines the engaging part 200 of said lever with the shoulder 201 corresponding to the depressed key. Upon operating the hand-piece 60, when the key is still in its depressed position, the corresponding power-transmitting device 171 will force the locking member 163 coacting therewith out of engagement with the corresponding controlling member, whereupon said controlling member will be released and will move rearwardly until arrested by the engagement with said engaging part 200 of its shoulder 201 corresponding to the depressed key.

The means for moving the controlling members 119 from and toward their normal position comprises independently operating springs 202 and the arms 59 of the actuating member, the springs 202, Fig. 11, being connected to the power-transmitting members 100 and operating to rock said members in one direction and move the controlling members rearwardly, and the arms 59, Fig. 33, serving to return the controlling members against the action of the springs 202. Said arms 59 preferably extend radially from the shaft 56, and are provided at their free ends with pivoted tappets 203 having engaging ends or shoulders for coacting with adjustable engaging shoulders 204, Fig. 31, carried by the controlling members, the tappets 203 being movable in one direction from their normal position relatively to the arms 59 against the action of springs 205, and being provided with shoulders 206 for engaging shoulders 207 on the arms 59 and thereby preventing movement of the tappets in the opposite direction from their normal position relatively to the arms 59. Immediately upon the commencement of the forward movement of the free end of the hand-piece 60, the controlling members corresponding to the keys 5, 6 depressed, and the controlling members at the right thereof will be released and moved rearwardly, and upon further forward movement of the free end of the hand-piece 60, the tappets 203 will engage the shoulders 204 on the released controlling members and be moved thereby relatively to the arms 59 against the action of the springs 205 until the tappets have passed the shoulders 204, whereupon the springs 205 will return said tappets to their normal position. When the free end of the handpiece 60 is moved rearwardly, the tappets 203 will engage the shoulders 204 on the controlling members, not in their normal position, and said tappets being prevented from movement relatively to the arms 59 by the engagement of the shoulders 206, 207, will return these controlling members to their normal position. As usually constructed the engaging shoulders 204 are provided on the free ends of movable parts 208 having their opposite ends pivoted to the controlling members 119. Said free ends of the parts 208 are adjustable about the axes of their pivoted ends relatively to the controlling members by means, here shown as screws 209, carried by the controlling members.

As generally constructed the multiplying mechanism, Fig. 41, consists of means which prevents the releasing of the locking means for the depressed keys 5 during a predetermined number of complete operations of the actuating member. As here illustrated, the multiplying mechanism comprises the spring 48, a rotary wheel 210, a ratchet-wheel 211, an escapement-pawl 212, and a spring 213. The spring 48 which is connected to the movable bar 43 tends to elevate the inner or rear end of said bar sufficiently, relatively to the tappet 50 of the actuating member, to prevent the tappet from engaging the shoulder 51 of the bar 43 and transmitting motion to said bar to release the locking means for the depressed keys 5. The rotary wheel 210 is provided with a shoulder 214 which normally engages the upper edge of the bar 43 and holds the inner end of said bar depressed against the action of the spring 48, so that the shoulder 51 is in position to be engaged by the tappet 50 upon each complete operation of the actuating member. When the wheel 210 is moved by hand in one direction from its normal position, the shoulder 214 is raised, thus permitting the spring 48 to elevate the inner or rear end of the bar 43, and as the wheel 210 is moved in the reverse direction, the shoulder 214 approaches the inner or rear end of the bar 43 and finally forces the same into position to be engaged by the tappet 50. The ratchet-wheel 211 is revoluble with the wheel 210, and coöperates with the escapement-pawl 212 to control the return movement of said wheels 210, 211 by the spring 213 which is connected to the ratchet-wheel 211 and returns said wheels 210, 211 to their normal position step by step upon each complete operation of the actuating member.

The escapement-pawl 212 is held in its normal position by a spring 215, and is provided with a laterally projecting arm 216 having an arm 217 pivoted to the free end thereof, and provided with an engaging end or shoulder for coacting with a shoulder 218, Fig. 33, which is carried by the actuating member and operates the escapement-pawl 212 upon the return movement of said actuating member to permit the spring 213 to move the ratchet-wheel 211 and the rotary wheel 210 a single step toward their normal position. The arm 217 is movable in one direction relatively to the arm 216 against the action of a suitable spring 219, and is prevented from movement in the opposite direction relatively to the arm 216 by any suitable means, as a shoulder 220 provided on said arm 216. After the wheels 210, 211 have been set to effect the desired action of the multiplying mechanism, continued operations of the actuating member effect the return movement of the wheels 210, 211 step by step until the shoulder 214 has moved the free end of the bar 43 into position to be engaged by the tappet 50 upon the next operation of the actuating member, and to force the locking means for the depressed keys 5 out of their operative position and thus permit the return or upward movement of said keys.

The calculating mechanism, as preferably constructed, comprises a carriage, means for moving the carriage laterally, calculating members supported by the carriage, and transferring means. The carriage 221, Figs. 13 and 14, is of any desirable form, size and construction, and is movable laterally on guide-rods 222, 223, Fig. 1, of the frame 1. The means for moving the carriage laterally is here shown as comprising a rock-shaft 224, Figs. 34, 35 and 41, arranged lengthwise of the frame 1 at one side thereof. One end of the shaft 224 is provided with a cam 225 for engaging the carriage and forcing the same laterally against the action of a spring 226, Fig. 15, encircling the guide-rod 223, and its other end is provided with a laterally projecting arm 227, Fig. 34, having a shoulder 228, Fig. 35, thereon. Said rock-shaft 224 is operated by suitable means comprising the key 8 which is connected to the rock-shaft 224 by a link 229 having one end pivotally connected to the shank of the key 8, and its other end provided with a slot 230 for receiving the shoulder 228 and permitting the key 8 and the link 229 to move independently of the rock-shaft 224 and the arm 227. The key 8 is held in its normal or inoperative position by a spring 231, Fig. 41, and in its depressed or operative position by a catch 232 pivoted intermediate of its ends and forced into operative position by a spring 233, the upper arm of the catch being provided with a shoulder for coacting with a shoulder 234 on the shank of the key 8 and holding said key depressed against the action of the spring 231. The lower arm of the catch extends into the path of a shoulder 235, Figs. 2 and 41, which is provided on the bar 43, and engages said lower arm as the bar 43 is forced rearwardly, thus disengaging the shoulder on the upper arm of said catch from the shoulder 234 and releasing the key which is then forced upwardly by the spring 231.

In the preferable embodiment of this invention, the key 8 is connected to all of the movable means or levers 193 except the one at the left-hand side of the machine, and when depressed, said key forces all of the levers 193, except the left-hand one, from their normal position. The connection between the key 8 and said levers 193 consists of the rock-shaft 89 and the link 90, the rock-shaft 89 being journaled in the sides of the frame 1, and provided with a cam 236, Figs. 1 and 41, normally resting upon the upper edges of the forwardly extending arms of all of the levers 193 except the left-hand one. As the key 8 is depressed, the link 90 connecting the key to the rock-shaft 89 moves said shaft and actuates the cam 236 to simultaneously depress the free ends of the forwardly extending arms of the levers 193 engaged thereby and elevate the free ends of the forwardly extending arms of the corresponding levers 194 into an inoperative position above the plane of the uppermost shoulders 201 of the controlling members 119. The cam 236 does not extend across the left-hand lever 193, and consequently, when the key 8 is depressed, said lever 193 remains in its normal position and may be operated, if desired, by any of the left-hand series of keys including the key 6, to record one of the words, as note, check, draft, etc., in connection with the sum, or total, accumulated by the calculating mechanism.

The calculating members 237, Figs. 13 and 14, preferably consist of wheels loosely mounted on a shaft 238 of the carriage 221, each wheel being formed with opposite substantially similar parts or halves having cam-faces 239, 240, and shoulders 241. Said cam-faces 239, 240 usually diverge toward the shaft 238 from opposite sides of a line 242, Fig. 13, drawn through the axis of the shaft 238, and said shoulders 241 which correspond to the cipher and the numerals 1 to 9, inclusive, are arranged one in advance of the other at unequal distances from the axis of the shaft 238, and during the rotation of the calculating members are successively moved into position to be engaged by rearwardly extending arms 243, Fig. 16, on the corresponding power-transmitting members 100. These calculating members and the shoulders 241 thereof are normally arranged out of alinement with the arms 243 and are moved into alinement therewith when the carriage is shifted to the right by the key 8.

The shoulders 241 of the calculating members corresponding to the cipher are located a greater distance from the shaft 238 than any of the other shoulders 241, and are arranged between the outer ends of the cam-faces 239, 240. In order to construct the cam-faces 240, as described, separate shoulders 241 corresponding to the numeral 1 are omitted, and additional and shorter arms 244 are provided on the power-transmitting members 100, and engage the shoulders 241, Fig. 17, corresponding to the ciphers, when the calculating members are in position to coact with said power-transmitting members 100 and aline the numerals 1 of the recording members in the printing field.

Each calculating member 237 is rotatable in reverse directions independently of the remaining members 237, and is fixed to a toothed wheel 245 and to one of the toothed wheels 126. Consequently, as the wheels 126 are rotated by the arms 124, 125 of the power-transmitting elements 121, the calculating members 237 and the wheels 245 are also rotated. The calculating members are held in their different positions assumed during the rotary movement thereof in either direction by suitable means, Figs. 13 and 14, preferably comprising arms 246 pivotally supported at their lower ends and provided at their upper ends with rollers 247 movable into and out of the spaces between the teeth on the wheels 245, said arms being yieldingly held in their operative position by springs 248.

Each transferring means preferably includes a lever 249, oppositely-acting pawls 250, 251, and a stop-shoulder 2490, the lever 249 being pivoted at its upper end at 252 and movable in reverse directions, the pawls 250, 251 being oppositely arranged, pivotally supported on the lower or free end of the lever 249, and provided with pins 253, and the stop-shoulder 2490 being fixed to the lever 249. Said pawls 250, 251 are movable alternately by springs 254 into position to coact with the toothed wheels 245. The pawls 250 are normally held by the springs 254 in operative position to coöperate with the wheels 245, and the pawls 251 are normally held in inoperative position by levers 255 pivoted to the levers 249, each lever 255 being provided with oppositely extending arms 256, 257 coacting with the pins 253 on the corresponding pawls 250, 251 for holding said pawls alternately in inoperative position. The levers 255 are movable on their pivots by any suitable means, Figs. 1 and 13, here illustrated as comprising levers 258, a rock-shaft 259, a link 260, and the hand-piece 156, the levers 258 being pivoted intermediate of their ends to the levers 249, and provided with separated opposing shoulders 261 for engaging stop-shoulders 262 on the levers 249 to limit the movement of said levers 258 in opposite directions relatively to the levers 249. Said link 260, Fig. 1, extends at the side of the machine from the hand-piece 156 to an arm depending from the rock-shaft 259. When the levers 255 are rocked in either direction, the arms projecting in one direction therefrom move upwardly and engage the pins 253 above these arms, and lift the pawls provided with said pins out of operative position, and the arms of the levers 255 projecting in the opposite direction, swing downwardly away from the pins 253 of the other pawls and permit the springs 254 to move the latter pawls into operative position. The stop shoulders 2490 enter between teeth of the wheels 245 as the levers 249 reach the limit of their forward movement, and thus prevent undue rotation of the calculating members 237, especially when the machine is used for subtraction. If addition is taking place and the levers 249 are moving forwardly on their pivots 252, the pawls 250, which are then in operative position, will ride over the wheels 245 without rotating the same, but upon the return movement of the levers 249 the pawls 250 will engage teeth of the wheels 245 and advance said wheels a single step. On the contrary, when the machine is used for subtraction, the hand-piece 156 is operated and actuates the link 260, the rock-shaft 259, and the levers 258 to rock the levers 255 and move the pawls 250 from operative position, thus permitting the springs 254 to force the pawls 251 into operative position. When the levers 249 subsequently move forwardly, the pawls 251 will engage teeth of the wheels 245 and advance said wheels a single step in the reverse direction, the stops 2490 limiting the movement of the wheels 245, and said pawls 251 will ride over the teeth of the wheels 245 upon the return movement of the levers 249.

In the preferable embodiment of this invention, the levers 249 of the transferring means are moved forwardly by suitable springs 263, Figs. 1 and 13, having their rear ends connected to the levers 249 and their front ends connected to means, as a rock-shaft 264, for increasing the tension of the springs 263, to facilitate the rotation of the wheels 245 by the levers 249 when the machine is used for subtraction. The rock-shaft 264 is journaled in the carriage 221, is provided with arms 265 connected to the springs 263, and is also provided with an arm 266, Fig. 1, which is connected to the hand-piece 156 by a link 267, an arm on the rock-shaft 259, and the means, just described, connecting said shaft 259 to the hand-piece 156. When the hand-piece 156 is moved from its normal position in order to use the machine for subtraction, said hand-piece also rocks the shaft 264 and increases the tension of the springs 263.

The levers 249 are moved rearwardly to their normal position by means preferably comprising a rock-shaft 268, Fig. 13, journaled in the carriage 221, and provided with a plurality of cams 269 for coacting with faces 270 on the levers 249. The faces 270 are usually formed on movable parts 271 pivoted to the levers 249 and adjustable relatively to said levers by screws 272, and said faces 270 are normally separated from the cams 269 to permit the levers 249 to move forwardly independently of said cams. During each forward movement of the free end of the hand-piece 60, the shaft 268 is first rocked in one direction through a portion of its complete stroke, or travel, is then returned in the opposite direction to its normal position, and is again rocked in the first direction to the limit of its complete stroke.

The means for operating the rock-shaft 268, as described, is here illustrated, Fig. 2, as comprising a movable bar 273, extending from front to rear of the machine, an upright lever 274 and a link 275, the lever 274 being pivoted intermediate of its ends to the frame 1 and having its lower arm pivoted to the rear end of the bar 273, and the link 275 being pivoted to the upper arm of the lever 274 and to an arm 276 on the rock-shaft 268. A suitable spring 277 connected to the lever 274 holds the upper end of said lever against a stop 2740, and serves to move the bar 273 forwardly after the same has been forced rearwardly against the action of said spring. The front end of the bar 273 is free to move vertically and is provided with shoulders 278, 279, and a yielding extension 280, said shoulders 278, 279 being spaced apart and engaged successively by a shoulder 281 on the actuating member, and the extension 280 being engaged by a shoulder 282 on the actuating member to disengage the shoulder 278 from the shoulder 281. Said forward end of the bar 273 is supported in the desired horizontal plane by an arm 283, Figs. 2 and 35, connected to a spring 284, and pivoted at one end, and provided at its other end with a roller 285 which engages the lower edge of the bar 273. As the free end of the hand-piece 60 commences to move forwardly, the shoulder 281 moves rearwardly, and engages the shoulder 278 on the bar 273 and moves said bar rearwardly through a portion of its travel until the shoulder 282, which is moving downwardly, engages the upper edge of the extension 280 and depresses the forward or free end of the bar 273 against the action of the arm 283 and disengages the shoulder 278 from the shoulder 281, whereupon the spring 277 returns the bar 273 forwardly to its normal position independently of the actuating member. When the bar 273 reaches its normal or forward position, the shoulder 281 which is still moving rearwardly engages the shoulder 279 and moves the bar 273 rearwardly to the limit of its travel. The cams 269 which are fixed to the shaft 268 partake of the movements of the bar 273, since the connections previously described, between said shaft and bar impart the movement of the one to the other.

After the rock-shaft 268 has been forced to the limit of its stroke effected by the complete rearward movement of the bar 273 during the forward movement of the free end of the hand-piece 60, said rock-shaft and the cams 269 fixed thereto are free to move or return slightly in the reverse direction and are then temporarily restrained from further return movement in such reverse direction until the free end of the hand-piece 60 is about to reach the limit of its rearward movement. The power-transmitting elements 121 move the calculating members 237 while the return movement of the cams 269 is temporarily restrained; and when subtraction is taking place, the levers 249 move forwardly after the cessation of the temporary restraint of the cams 269 and cause the pawls 251 to move the calculating members 237. Consequently, by temporarily restraining the reverse or return movement of the cams 269, all liability of the pawls 251 moving the calculating members 237 while said members 237 are being rotated by the power-transmitting elements 121 is avoided.

The means for temporarily restraining the reverse or return movement of the rock-shaft 268 consists of a bell-crank lever 286, Fig. 2, normally arranged in an inoperative position, and provided with a shoulder 287 for engaging a shoulder 288 on the arm 276. This lever 286 is connected to a spring 289 for forcing the same into position to engage the shoulder 288, and is held in its inoperative position against the action of the spring 289 by suitable means operated by the actuating member and comprising a rod 290 extending from front to rear of the machine and an upright lever 291, the rod 290 having its rear end pivoted to the lever 286, and its front end connected to the lever 291 intermediate of its ends, and the lever 291 having its upper end pivoted to the frame 1, and its lower end normally engaged by a shoulder 292 on the actuating member. Immediately upon the commencement of the forward movement of the free end of the hand-piece 60, the shoulder 292 moves away from the lower end of the lever 291 and allows the spring 289 to move the lever 286 into position to engage the shoulder 288 on the arm 276 after the free end of the arm 276 has been moved to the limit of its forward movement by the extreme rearward movement of the bar 273 and has returned slightly toward its initial position. The lever 286 remains in its operative position in engagement with the shoulder 288 until the free end of the hand-piece 60 is about the reach the limit of its rearward movement, whereupon the shoulder 292 engages the lower end of the lever 291 and forces the same forwardly, thus causing the rod 290 to rock the lever 286 and elevate the shoulder 287 out of engagement with the shoulder 288 and permit the spring 277 to retract the bar 273, lever 274, link 275, and arm 276.

In the preferable construction of my calculating machine, the levers 249 when forced to the limit of their travel effected by the rearward movement of the bar 273, as described, are restrained from operation by any suitable means, as catches, Figs. 13 and 14, loosely mounted on a shaft 293 intermediate of their ends, and each including two sections, one, 294, being provided with a shoulder 295 coacting with a shoulder 296 on one of the levers 249, and being also provided with a connecting part or pin 297 movable endwise in a plane at right angles to the line of movement of the catches, a pivoted connecting part or member 298, Figs. 15 and 19, provided with an engaging face 299, and a spring 300 for holding the pivoted member 298 in its normal position; and the other section 301 being provided with cam-faces 302, 303 coacting with the pin 297 to move the same endwise in opposite directions. Said catch-sections 294, 301 are connected by springs 304 and are provided, respectively, with pins 305 and slots 306 for limiting the movement of the sections 301 relatively to the sections 294, the springs 304 serving to rock the catch-sections 301 in one direction relatively to the sections 294 until the lower end walls of the slots 306 engage the pins 305. The movement of the catch-sections 301 by the springs 304 causes the cam-faces 302 to withdraw the connecting parts or pins 297 endwise to their inoperative position with their ends opposite the cam-faces 302, 303 at one side of the paths of movement of the free ends of the connecting parts or members 298 on contiguous catches, as shown in Fig. 19. Said members 298 are pivoted at 307 intermediate of their ends to the catch-sections 294 and comprise substantially horizontal arms engaged by the springs 300, and also depending arms, the free ends of which are formed with the faces 299 for encountering the underlying ends of the connecting parts or pins 297 on contiguous catches after said pins have been forced endwise to their operative position, indicated by dotted lines, Fig. 19, by the cam-faces 303 on the catch-sections 301. In case a connecting part or pin 297 is forced to its operative position after the downward movement of the front end of the catch provided with the part or member 298 for coacting with said connecting pin, the upward movement of the free end of the latter catch will not be retarded, since the lower end of the depending arm of such member 298 is free to yield against the action of the corresponding spring 300 and thus pass above said connecting pin. The catches for restraining the levers 249 from operation, are held in operative position by springs 308, Figs. 13 and 14, and are moved from said position by upright levers 309, the lower ends of these levers being loosely mounted on a movable shaft 310 having its extremities supported in the rear ends of substantially horizontal arms 311, Figs. 13, 14 and 15, pivoted at their front ends to the sides of the carriage 221.

The levers 309 are provided at their upper ends with slots 312 and engaging shoulders 313, Figs. 13 and 14, coacting, respectively, with pins 314 on the catch-sections 301, and with the cam-faces 239, 240 of the calculating members 237. The rear ends of the arms 311 are connected by upright links 315 with arms 316 projecting rearwardly from the shaft 259, and consequently, the movement of the shaft 259 which takes place when the hand-piece 156 is forced from its normal position, causes the arms 316, the links 315, and the arms 311 to move the levers 309 downwardly to their position assumed when subtraction takes place. As the upper ends of the levers 309 are rocked rearwardly by the engagement of their shoulders 313 with the cam-faces 239, 240 of the calculating members 237, the pin and slot connections between the catch-sections 301 and the levers 309 rock the front ends of the sections 301 downwardly independently of the sections 294 until the upper end walls of the slots 306 coact with the pins 305, as seen in Fig. 14, whereupon further downward movement of the front ends of the sections 301 forces the sections 301 and 294 downwardly together.

When addition is taking place, the arms 125 of the power-transmitting elements 121 engage the wheels 126 and rotate the calculating members 237 during the forward movement of the elements 121 taking place while the free end of the hand-piece 60 moves rearwardly in the operation of the machine by the actuating member. Just before the members 237 reach the position illustrated in Fig. 13, their cam-faces 239 coact with the shoulders 313 of the corresponding levers 309 and move the upper ends of said levers backwardly sufficiently to rock the corresponding catch-sections 301 independently of the catch-sections 294 and engage the upper walls of the slots 306 of these sections 301 with the pins 305 of the sections 294 and force to their operative position the connecting pins 297 carried by said sections 294. After the units calculating member has assumed the position indicated in Fig. 13, one of the two shoulders 241 thereof corresponding to the numeral 9, is in position to coact with the arm 243 of the units power-transmitting member 100, should the carriage 221 be shifted to the right, in order that the amount accumulated by the members 237 may be indicated or recorded, and one of the cam-faces 239 of this member 237 is in position to coöperate with the shoulder 313 on the right-hand catch-releasing lever 309, upon the next advance movement of said member 237 effected during the rearward movement of the free end of the hand-piece 60, and to thus additionally move the lever 309 backwardly to force the catch operated by said lever from engagement with the right-hand lever 249 coacting with the tens calculating member. Upon the release of said lever 249 from the catch coöperating therewith, the spring 263 connected to this lever moves the same forwardly slightly, into engagement with the cam 269 coacting with said lever, so that re-engagement of said catch with the lever 249 normally restrained thereby, will not be possible when the spring 308 restores this catch to its operative position after the cam-face 239 passes beyond, and out of engagement with, the shoulder 313 of said catch-releasing lever 309 during the last-mentioned advance movement of the units calculating member 237. As the free end of the hand-piece 60 reaches the limit of its rearward movement which effects the last-mentioned advance of the units calculating member 237, the shoulder 292 on the actuating member operates the lever 291 and the rod 290 to rock the lever 286 and disengage its shoulder 287 from the arm 276 on the shaft 268 provided with the cams 269, whereupon the spring 277 operates the parts 274, 275, 276 and 268 to return the cams 269 to their normal position, and at the same time the springs 263 move forwardly the free ends of any of the levers 249 previously released from their catches and carry the pawls 250 thereof over underlying teeth of the corresponding wheels 245 into operative position to effect an advance step of said wheels upon the backward movement of the rear ends of these levers 249. Upon the next forward movement of the free end of the hand-piece 60, the shoulders 278, 279 and 281, and the spring 277 coact to cause the bar 273, lever 274, link 275 and arm 276 to move, or rock, the shaft 268 and its cams 269 backwardly throughout a portion of their complete throw or travel, and then forwardly to substantially their initial position, and finally rearwardly to the limit of their movement. The levers 249 previously released from their catches and drawn forwardly by the springs 263 connected thereto, are moved, or rocked, rearwardly a limited distance by the partial rearward movement of said cams 269, are then drawn forwardly by the springs 263 to the limit of the throw of said levers as the cams 269 rock forwardly, and are finally rocked rearwardly to their initial position during the complete rearward movement of these cams 269. Said levers 249 reach their initial position while the shoulders 281, 279 are engaged and substantially at the cessation of the forward movement of the free end of the hand-piece 60, and are thereupon again caught by their catches and held thereby from forward movement. After the engagement of said levers 249 by their catches, the cams 269 rock forwardly slightly until the shoulder 288 on the arm 276 encounters the shoulder 287 of the lever 286, whereupon further forward movement of said cams is prevented until the rearward movement of the free end of the hand-piece 60 is about complete, at which time the lever 286 is forced out of operative position and no longer restrains the forward movement of the cams 269 effected by the spring 277 and the parts connecting this spring to said cams.

As the machine is operated, the advances of the units and tens calculating members may continue until both of said members are in the position illustrated in Fig. 13. Upon the rearward movement of the free end of the hand-piece 60 in the next operation of the machine by the actuating member, the units calculating member 237 releases the right-hand lever 249 from its catch, and upon the completion of said rearward movement, the free end of this lever 249 swings forwardly until the pawl 250 carried thereby, is in position to engage the underlying wheel 245 and advance the tens calculating member 237 a single tooth upon the complete rearward movement of said lever 249 effected during the forward movement of the hand-piece 60 taking place in the next operation of the machine. At the commencement of said forward movement of the free end of the hand-piece 60, the right-hand lever 249 moves rearwardly a limited distance and advances the tens calculating member a part of a complete step, but as soon as the shoulder 281 is disengaged from the shoulder 278 of the bar 273, said lever 249, and the tens calculating member return to the position occupied thereby at the commencement of said movement of the hand-piece 60. The movement of the tens calculating member 237 taking place during the engagement of the shoulders 281, 278, although not enough to effect a complete advance or step of said member 237, is sufficient to cause the cam-face 239 of the tens calculating member 237 to coact with the shoulder 313 of the lever 309 next to the right-hand lever 309 to force the catch next to the right-hand catch from engagement with the lever 249 next to the right-hand lever 249. Consequently, as the right-hand lever 249 and the tens calculating member 237 return forwardly after their partial advance, the lever 249 next to the first-mentioned lever 249 moves forwardly and arranges the pawl 250 carried thereby in position to effect an advance or step of the hundreds calculating member. As the forward movement of the free end of the hand-piece 60 continues after the disengagement of the shoulders 281, 278, the shoulder 281 encounters the shoulder 279 and causes the bar 273 and the means connecting the same to the cams 269 to force said cams rearwardly to the limit of their movement, thus rocking the right-hand lever 249 and the lever 249 contiguous thereto backwardly and simultaneously advancing the tens and hundreds calculating members 237.

When the sum accumulated by the calculating members 237 contains a plurality of nines, as 999, these members 237 have all been advanced to the position illustrated in Fig. 13, and the levers 309 coacting with said members 237 have been forced backwardly sufficiently to move the sections 301 of the corresponding catches relatively to the sections 294 of said catches, and engage the upper walls of the slots 306 in these sections 301 with the pins 305 of said sections 294, and force the connecting pins 297 of these sections 294 outwardly into position to coact with the contiguous pivoted connecting parts or members 298. It therefore follows that when the catch of lowest order of said catches is forced from engagement with the corresponding lever 249, the pivoted connecting part or member 298 mounted on this catch engages the projecting end of the connecting part or pin 297 on the catch of next higher order, and moves the latter from operative position. Said latter catch also similarly operates that of next higher order.

When the machine is used for subtraction, the free end of the hand-piece 60 is moved forwardly, in the operation of the actuating member of the machine, but before the rearward movement of said free end, the hand-piece 156 is moved from its normal position and actuates the mechanism, previously described, which engages the arms 124 of the power-transmitting elements 121 with the wheels 126, operates the levers 255 for lifting the pawls 250 out of operative position and permitting the springs 254 to force the pawls 251 into position to coact with the wheels 245, and also moves the levers 309 downwardly. During the rearward movement of the free end of the hand-piece 60 after the operation of the hand-piece 156, the power-transmitting elements 121 rotate the calculating members 237 in a direction opposite to that in which they are revolved when the arms 125 are engaged with the wheels 126.

Just before the commencement of the last step of each complete half revolution of the units calculating member 237, when subtraction is taking place, a cam-face 240 of said member 237 is in the position indicated by dotted lines in Fig. 13, and when said calculating member is in this position the downward movement of the levers 309 effected by the operation of the hand-piece 156, arranges the shoulder 313 of the corresponding lever 309 in position to coact with said cam-face 240 in order to release the right-hand lever 249 from the catch coacting therewith. As said lever 309 moves downwardly, its shoulder 313 rides a limited distance along the cam-face 240 of the units calculating member 237, thus moving the upper end of this lever 309 backwardly, rocking the catch-section 301 connected to said lever relatively to the corresponding catch-section 294, and forcing the connecting part or pin 297 of said section 294 endwise into position to be engaged by the pivoted connecting part or member 298 of the contiguous catch. Consequently, when a number of the calculating members have each made nine reverse steps and the connecting parts or pins 297 have been moved endwise as described into operative position, the downward movement of the catch of lower order causes the pivoted connecting part or member 298 thereof to engage the connecting part or pin 297 of the catch of next higher order, so that all of the catches corresponding to said calculating members 237 will move downwardly together, the same during subtraction as in addition.

When indicating or recording the total amount accumulated by the calculating members 237, the carriage 221 is moved laterally relatively to the frame 1, as described, and carries the members 237 into alinement with the arms 243, 244 of the power-transmitting members 100, in order that when the controlling members 119 are released by the depression of the key 8 and moved rearwardly by the springs 202, shoulders 241 of the calculating members 237 may be engaged by the arms 243, 244 and thus serve as means to limit the movement of the members 119 in bringing the characters 98 of the recording members 96 into the printing field, so that said characters will indicate the amount accumulated. In the preferable construction of this machine, the shaft 224 for moving the carriage 221 laterally, is temporarily prevented from returning to its normal position by locking means, Figs. 42, 43 and 44, movable into operative position after the carriage 221 has been forced laterally from its normal position, and comprising two sections, one, 317 being movable vertically on a horizontal pivot 318 arranged, Fig. 2, at substantially a right angle to the shaft 224, and being provided with an arm 319, Figs. 43 and 44, for coacting with the arm 227 on the shaft 224; and the other section 320 being connected to the section 317 by a vertical pivot 321 and provided with an arm 322 having a downwardly extending free end formed with a cam-face 323 coacting with the shoulder 235 on the bar 43. The section 317 engages a stop-shoulder 324 on the frame 1, and the section 320 is yieldingly held in its normal position relatively to the section 317 by a spring 325 mounted on said section 317.

As seen in Fig. 44, the free end of the arm 227 is normally arranged beneath the arm 319 of the locking means which temporarily prevents the return movement of the carriage 221. Upon the depression of the key 8, the link 229 rocks the shaft 224, forcing the carriage 221 to the right and moving the free end of the arm 227 inwardly beyond the arm 319 to the position indicated by dotted lines in Fig. 44, whereupon the locking means for preventing the return of the carriage 221 swings downwardly by gravity on the pivot 318 into engagement with the shoulder 324 and carries the arm 319 into the path of the free end of the arm 227. Said arm 319 then prevents outward movement of the arm 227 and holds the shaft 224 against the action of the spring 226 tending to shift the carriage 221 to the left and return the shaft 224 to its normal position. As the free end of the hand-piece 60 is moved rearwardly during the next operation of the actuating member after the depression of the key 8, the tappet 50 on the actuating member engages the shoulder 51 and moves the bar 43 rearwardly causing the shoulder 235 to disengage the catch 232 from the key 8, whereupon the spring 231 moves the key 8 upwardly independently of the shaft 224, or the locking means for restraining the return movement of said shaft. As the bar 43 moves rearwardly, a beveled face on the shoulder 235 engages the downwardly extending free end of the arm 322 of the locking means for the shaft 224, and forces said arm outwardly against the action of the spring 325 until the shoulder 235 is at the rear of the cam-face 323, Fig. 43. The return movement of the bar 43 effected by the spring 48 engages the shoulder 235 with the cam-face 323 on the free end of the arm 322 and rocks the locking means for the shaft 224 upwardly on the pivot 318, so that the arm 319 is elevated above the path of the arm 227, whereupon the spring 226 returns the carriage 221 and the shaft 224 to their normal position, the arm 227 then preventing downward movement of said locking means on the pivot 318. When the key 8 is forced downwardly to move the carriage 221 laterally preparatory to indicating or recording the total, the cam 236 depresses the free ends of the forwardly extending arms of all the movable parts or levers 193, with the exception of the left-hand one, thus raising the free ends of the forwardly extending arms of the corresponding movable parts or levers 194. The depression of the free ends of the forwardly extending arms of said levers 193 permits the springs 177 to move the arms 176 of the corresponding power-transmitting devices 171 into position to be engaged by the arms 174 of said devices, and consequently, upon the forward movement of the free end of the hand-piece 60, all of the locking members 163, except the left-hand one, will be forced from operative position, thereby releasing all of the corresponding controlling members 119 from said locking member 163. If any of the calculating members 237 are in their initial position at the time a number of the controlling members 119 are released from their locking members, the arms 243 of the corresponding power-transmitting members 100 will coact with the shoulders 241 of said members 237, corresponding to the cipher, and in order to effect such coöperation of these arms 243 and shoulders 241, said controlling members 119 and power-transmitting members 100 will be moved slightly rearwardly by the springs 202 independently of the corresponding power-transmitting elements 121, as previously described, sufficiently to actuate the corresponding recording members to bring their ciphers into the printing field. It is generally the case when taking a total that only a part of the calculating members 237 have been used in the operation of accumulating the amount represented by the total, and therefore, as all of the controlling members 119, except the left-hand one, are released by the locking members 163 upon the depression of the key 8, this machine is preferably provided with additional means for holding from movement all of the controlling members (except the left-hand one) which coact with the calculating members 237 arranged at the left of said members 237 used in accumulating the amount indicated in the printing field upon the depression of the key 8 and the forward movement of the hand-piece 60. Said holding means, as illustrated, comprises a movable carriage, locking members, one for each controlling member 119, means for holding the locking members in their operative or inoperative positions, means for returning the locking members to their operative position, means for moving the carriage laterally from its normal position relatively to the controlling members 119 and the locking members 163, and means for temporarily preventing the return of the carriage to its normal position.

The carriage 326, Figs. 32 and 33, is of any desirable form, size and construction, and is preferably provided at its ends with projections 327 guided in opposite sides of the frame 1.

As generally constructed, the locking members 328, Figs. 32 and 33, consist of arms loosely mounted at their rear ends on a shaft 329 supported by the carriage 326, and having their front ends provided with laterally projecting pins 330, 331 and with upturned extensions 332, Figs. 31 and 33, which project into the paths of shoulders 333, Fig. 31, on the locking members 163. The pins 330 are normally arranged in notches 334, Fig. 30, in the lower edges of the front ends of the controlling members 119, and are forced out of these notches by the shoulders 333 which upon the operation of the locking members 163 engage the extensions 332 and depress the front ends of the locking members 328.

The means for holding the locking members 328 in their operative or inoperative positions consists of arms 335 having their lower ends loosely mounted on a shaft 336 supported by the carriage 326, and their upper ends provided with a plurality of notches 337, one above the other, which receive the pins 331, said arms 335 being yieldingly held in their operative position by suitable springs 338. When the pins 331 are in the upper notches 337, the locking members 328 are held in their operative position. Upon the first movement of any one of the locking members 163 taking place after the machine has been operated to restore the calculating members 237 to their initial position, the shoulder 333 carried by this locking member 163 depresses the front end of the locking member 328 in the path of said shoulder and forces this locking member to its inoperative position with its pin 330 out of the notch 334 of the corresponding controlling member 119, and its pin 331 in the lower notch 337 of the arm 335 coacting with said locking member.

The means for returning the locking members 328 to their normal position with their pins 330 in the notches 334 of the controlling members 119, and their pins 331 in the upper notches 337 of the arms 335, includes a rock-shaft 339 provided with a plurality of spring-arms 340, Figs. 30 and 33, and a radial arm 341, said spring arms being located beneath the locking members 328. The radial arm 341 is arranged at one side of the carriage 326, Fig. 32, and is provided at its free end with a pivoted engaging part 342, Figs. 31 and 33, connected to a spring 343, and having a shoulder 344 which engages a shoulder 345 on the arm 341 to prevent movement of this engaging part in one direction from its normal position relatively to the arm 341. The engaging part 342 coacts with a shoulder 346 on the actuating member, and is suitably connected to the hand-piece 156 by a link 347 having one end provided with a slot 348 for receiving a pin 349 on one of the sections of the link 157, and having its other end pivoted to an arm 350 on the rock-shaft 339. Said engaging part 342 is normally arranged at one side of the plane in which the shoulder 346 travels, but although the lateral movement of the carriage 326 forces the part 342 into vertical alinement with the path of movement of the shoulder 346, the part 342 will not be engaged by the shoulder 346 when the actuating member is operated in taking the total accumulated by the machine, since said part 342 is then beneath the path of the shoulder 346. Should it, however, be desired to clear the machine to restore the calculating members 237 and the locking members 328 to their initial position, the engaging part 342 upon the movement of the hand-piece 156 from its normal position is elevated into the path of the shoulder 346, and consequently, when the free end of the hand-piece 60 is moved rearwardly in the operation of the actuating member, the shoulder 346 encounters the part 342 and rocks the rear end of the arm 341 upwardly, thus engaging the spring-arms 340 with the locking members 328 and elevating the front ends of said locking members sufficiently to cause their pins 330 to enter the notches 334 in the controlling members 119, and their pins 331 to enter the upper notches 337 in the arms 335.

Whenever any one of the calculating members 237 is advanced from its initial position by the lever 249 coacting therewith, the controlling member 119 for coöperating with this calculating member should be released from its locking member 328, so that in the subsequent operation of taking the total, this controlling member may move rearwardly and engage said calculating member to indicate in the printing field the number accumulated. Each locking member 328 is therefore connected to the calculating member 237 of the next lower order by suitable means comprising a lever 351 and a link 352, Figs. 1 and 40, the lever 351 being loosely mounted on a shaft 353 supported by the frame 1, and having an upwardly extending yielding arm arranged in the path of the lower end of the lever 309 operated by the calculating member of lower order, as the units member, and the link 352 having its rear end connected to the lever 351 beneath the shaft 353, and its front end connected to an arm 354, Fig. 33, depending from the locking member 328 of next higher, or tens, order. Consequently, when a calculating member 237 of lower order, as the units member, operates the right-hand lever 309 to effect an advance step of the calculating member of next higher, or tens, order, the lower end of said lever 309 coacting with this calculating member engages the corresponding lever 351 and moves rearwardly the link 352 connected to this lever 351, thereby depressing the free end of the locking member 328 coacting with the tens controlling member 119, and forcing the pin 330 of this locking member out of the notch 334 in said controlling member.

The means for moving the carriage 326 laterally comprises a cam 355, and means for operating this cam when the key 8 is depressed, the cam 355 being movable on an axis extending from front to rear of the machine and engaging a shoulder 356, Fig. 2, at one end of the carriage 326, for forcing said carriage laterally to the left against the action of a suitable spring 3560, Fig. 32, and the operating means for such cam consisting of a rock-shaft 357, Figs. 2 and 32, extending from front to rear of the machine and having the cam 355 fixed thereon, and a link 358, Figs. 2 and 34, having one end pivoted to an arm on the rock-shaft 224, and its other end provided with a slot 359, Fig. 34, which receives a pin 360 on an arm projecting from the rock-shaft 357. The slot 359 permits the shaft 224 to rock upwardly independently of the shaft 357 when the locking means for preventing the return of the shaft 224 is forced out of operative position, thereby disengaging the arm 319 from the arm 227. The depression of the key 8 thus operates the cam 355 to move laterally to the left the carriage 326 and the parts supported thereby, including the locking members 328, the lateral movement of these parts being sufficient to arrange the extensions 332 of the members 328 out of the paths of the shoulders 333 of the locking members 163, so that the movement of the members 163 effected by the operation of the actuating member immediately following the depression of the key 8, will not operate any of the locking members 328 to release the corresponding controlling member.

The means for temporarily preventing the return of the carriage 326 to its normal position usually comprises a horizontally moving locking means, as an arm 361, Figs. 2 and 38, and means for forcing this arm into its operative position after the key 8 has rocked the shaft 357 to move the carriage 326 laterally. The arm 361 is mounted on the lower end of an upright shaft 362, and is movable into the path of an arm 363 on the shaft 357, the latter arm normally engaging the arm 361 and holding the same in an inoperative position. As the shaft 357 is rocked by depressing the key 8 to move the carriage 326 laterally from its normal position, the arm 363 rises above the arm 361, whereupon said arm 361 is moved automatically into operative position underneath the arm 363 and prevents the return movement of the shaft 357 and the carriage 326.

The upper end of the shaft 362 is preferably connected to means actuated by the keys 5 for forcing from its operative position the locking means 361 which restrains the lateral return movement of the carriage 326 to its normal position, the illustrated connection between the shaft 362 and the keys 5 comprising a longitudinally movable bar 364, Fig. 34, arranged at the rear of the bar 42, and a link 365 having one end pivoted to an arm 366 on the shaft 362, and its other end pivoted to the bar 364. A spring 367, Fig. 34, is connected to the bar 364 and serves to automatically force said locking means 361 into its operative position underneath the arm 363. The bar 364 is pivotally supported at its opposite ends on the lower extremities of links 368 having their upper extremities pivoted to the frame 1 at opposite sides thereof, and is provided with upwardly extending shoulders 369 which coact with the shoulders 45 on the arms 36 operated by the keys 5. Upon the depression of any one of said keys 5, the corresponding shoulder 45 coacts with one of the shoulders 369 and forces the bar 364 against the action of the spring 367 thus rocking the shaft 362 and the locking means 361 mounted thereon out of the path of the arm 363 on the shaft 357 to permit the spring 3560 to effect the movement of the carriage 326 and the arm 363 to their normal position. By temporarily restraining the return movement of the carriage 326, ample time is afforded for the controlling members 119 and the locking members 163 to assume their operative position before the locking members 328 are again arranged with their extensions 332 in the paths of the shoulders 333 on the members 163.

In effecting the clearing of the machine, that is restoring movable parts thereof to their initial position, so that the machine may be used to accumulate from zero, the total key 8 is depressed, the free end of the hand-piece 60 is rocked forwardly, the key 7 is depressed, the hand-piece 156 is moved from its normal position, and the free end of the hand-piece 60 is rocked rearwardly. The depression of the key 8 shifts the carriages 221 and 326 laterally and operates the movable parts or levers 193, 194 to raise the free ends of the forwardly extending arms of the levers 194 above the plane of the uppermost shoulders 201 on the controlling members 119. During the forward movement of the free end of the hand-piece 60 the springs 202 move the released controlling members 119 until the arms 243, 244 of their corresponding power-transmitting members 100 engage shoulders 241 of the calculating members 237, said members 100 operating to move the recording members 96 into position to indicate or record the final total. After the cessation of the forward movement of the free end of the hand-piece 60, the key 7 is depressed, forcing the bar 43 rearwardly against the action of the spring 48 and causing the shoulder 235 on the bar 43 to force the catch 232 out of engagement with the key 8 and permit the upward movement of the latter by the spring 231, said bar 43 moving rearwardly until the shoulder 235 is at the rear of the face 323. Upon the upward movement of the key 8 the parts or levers 194 move toward their normal position to restrain further rearward movement of the controlling members 119 by the springs 202 when the carriage 221 is returned to its normal position by the spring 226. As soon as the key 7 is released from the force depressing the same, the shoulder 235 raises the arm 319 above the arm 227 and permits the return of the carriage 221 by the spring 226. The hand-piece 156 is moved from its normal position just before the return or rearward movement of the free end of the hand-piece 60, and operates to engage the arms 124 of the power-transmitting elements 121 with the wheels 126 of the calculating mechanism and to raise the free or rear end of the arm 341 so that the engaging part 342 thereof will project into the path of the shoulder 346 on the actuating member. As the free end of the hand-piece 60 moves rearwardly, the arms 124 rotate the wheels 126 and retract the calculating members 237 to their initial position, the arms 59 retract the controlling members 119, and the shoulder 346 coacts with the part 242 and actuates the arm 341 to force the locking members 328 into operative position with their shoulders 330 in the notches 334 of the controlling members 119 and their shoulders 331 in the upper notches 337 of the arms 335. The carriage 336 is not restored to its normal position with the calculating and controlling members, but remains locked against the action of the spring 3560 until one of the keys 5 is depressed and causes the shoulder 45 corresponding thereto to coact with one of the shoulders 369 on the bar 364 and force from operative position the locking means 361 which restrains the return movement of the carriage 326. This machine is preferably provided with an indicator 370 for informing the operator that all of the calculating members 237 are in their initial position.

The illustrated construction of indicator Fig. 1, is pivoted to the frame 1, and formed with a surface 371 having any suitable indicating means thereon, as the word (clear), said surface being normally out of the sight of the operator and movable into and out of registration with a display-opening, not shown, in the frame 1. The calculating mechanism governs the movement of the indicator in any desirable manner, and is here illustrated as controlling the operation of a U-shaped lever 372, Figs. 1 and 15, arranged astride the carriage 221 and having its central portion extended crosswise of said carriage at the rear of the calculating members 237, and its arms 373, 374 pivoted to the sides of the carriage, the arm 373 being connected to the indicator 270 by links 375, 376 and a bell-crank lever 377. The arm 373 is also connected to the rock-shaft 259 by a link 378 pivotally secured at its upper end to an arm on said rock-shaft, and having its lower end movable endwise in a bearing 379 on the arm 373. Said link 378 is provided with separated shoulders 380, 381 disposed on opposite sides of the bearing 379 and with a spring 382 arranged between the bearing 379 and the shoulder 381. Pivotally supported by each catch-releasing lever 309 is a locking member 383, Figs. 13 and 14, coöperating with the corresponding calculating member 237 for actuating said lever 309. The locking members 383 are connected to springs 384 and are each provided with upright arms 385, 386 spaced apart, one arm 385 coacting with the central portion of the lever 372, and the other, 386, having a shoulder 387 for coöperating with the shoulder 241, corresponding to the cipher, on the calculating member 237 with which the lever 309 supporting said locking member 284 coacts. When the calculating members 237 are in their initial position, the shoulders 241, corresponding to the cipher, engage the shoulder 387 on the locking members 383 and hold said members in an inoperative position against the action of the springs 384 connected thereto, with the arms 385 at the rear of the path of the central portion of the lever 372. The locking members 383 are also provided with depending arms 388 for engaging sleeves 389, Fig. 15, mounted on the shaft 310 between the levers 309, said arms 388 serving to limit the movement of the locking members 383 by the springs 384 when the calculating members 237 have been advanced or moved from engagement with the shoulders 387.

If the hand-piece 156 is moved from its normal position at a time when the calculating members are in their initial position, the link 260 and the rock-shaft 259 connected thereto elevate the link 378 and thus raise the front end of the arm 373 and depress the central portion of the lever 372 between the arms 385, 386 of the locking members 383. As the central portion of the lever 372 moves downwardly between the arms 385, 386, the links 375, bell-crank lever 377 and link 376 force the indicator 370 into its operative position. Providing any of the calculating members 237 are not in their initial position at the time the hand-piece 156 is operated during the clearing of the machine, the central portion of the lever 372 will engage the upper end of the arm 385 of the locking member 383 coacting with such calculating member, and consequently, said lever 372 will be prevented from actuating the indicator 370, and the bearing 379 carried by the lever 372 will form an abutment between which and the shoulder 381, the spring 382 will be compressed as the link 378 moves upwardly. Should said calculating member 237 be returned to its normal position while the spring 382 is compressed, the central portion of the lever 372 will then be free to pass between all of the arms 385, 386, and therefore the spring 382 will move the lever 372 and cause the same to actuate the indicator. It is thus apparent that in case any of the calculating members is not returned to its initial position during the operation of clearing the machine, that the indicator will not be actuated, in which event the operator will repeat the movements necessary to clear the machine.

The printing mechanism, Figs. 1, 20 and 25, generally consists of a movable support, a roller-platen, means for feeding the roller-platen, and means for moving the front or free end of the support toward and from the recording members 96. The support 390 is of any desirable form, size and construction, is pivotally mounted at its rear end on a non-revoluble shaft 391, and is preferably connected to a spring, 392 for facilitating the upward and rearward movement of the front end of the support 390. The shaft 391 is mounted in bearings in upright arms 393 provided on the adjustable cross-bar 2, is movable endwise in said bearings, and is provided with annular grooves 394 for receiving a stop-arm 395, Fig. 25, pivoted to one of the arms 393, and with fixed collars 396 for engaging opposite sides of the support 390 and causing said support to move endwise with the shaft 391. The roller-platen 397 supports a record-sheet, not illustrated, is journaled at is opposite ends in the sides of the support 390, and is provided at one end with a ratchet-wheel 398. As best seen in Figs. 1 and 20, the means for feeding the roller-platen 397 consists of an arm 399 loosely mounted on the shaft 391 and having a limited movement relatively thereto, a feeding pawl 400 having one end pivoted to the upper or free end of the arm 399, and its other end coacting with the ratchet-wheel 398, a spring 401 having one end connected to the pawl 400 intermediate of the ends thereof and its other end connected to the support 390, and an adjustable part, as a cam 402, provided on the support 390 and coacting with the free end of the pawl 400. The movement of the pawl 400 relatively to the shaft 391 is limited by separated shoulders 403 provided on the hub of the arm 399 and coacting with a shoulder 404 carried by one of the collars 396 on the shaft 391. A shoulder 405 on the support 390 coacts with the front edge of the arm 399 for moving said arm relatively to the shaft 391 in one direction. The means for moving the front end of the support 390 toward and from the recording members 96 comprises a substantially upright link 406, Fig. 20, movable endwise in substantially the same plane as the free end of the support 390, an arm 407 provided on the shaft 110 and pivoted to the lower end of the link 406, and the parts 110, 117, 68 and 118 previously described. A spring 408 is connected to the link 406 for facilitating upward or return movement of the latter. The upper end of the link 406 is provided with separated opposing shoulders 409, 410, for engaging upper and lower surfaces of a transverse rod 411 on the support 390, the upper shoulder 409 being carried by a movable hook-shaped part or catch 412 which is pivoted to the main part of the link 406, is held in its normal position by a spring 413, and is provided with a laterally projecting shoulder 414 disposed between opposing shoulders 415 on said main part of the link 406 for limiting the movement of the catch on its pivot.

During the forward movement of the free end of the hand-piece 60 in the operation of the actuating member, the shoulder 118 on said member encounters the arm 117 and moves the same upwardly, thus rocking the shaft 110 and moving the arm 406, the link 405, and the front end of the support 390 downwardly and carrying the roller-platen 397 into position to receive an impression from the recording members 96. As the front end of the support 390 moves downwardly from its normal position, the roller-platen 397, the ratchet-wheel 398 and the cam 402 carried by the support 390 move therewith relatively to the upper end of the arm 399, since the rear shoulder 403 engages the shoulder 404 and prevents movement of the arm 399 with the support 390. A partial downward movement of the front end of the support 390 disengages the cam 402 from the front end of the pawl 400 and permits the spring 401 to engage the pawl 400 with the ratchet-wheel 398, whereupon further movement of the support 390 effects the desired rotation of the roller-platen 397. Adjustment of the cam 402 varies the length of travel of the front end of the support 390 before the engagement of the pawl 400 with the ratchet-wheel 398, thus regulating the length of the advance movements of the roller-platen. If it is desired to elevate the front or free end of the support 390 beyond its normal position, the catch 412 is rocked on its pivot relatively to the main part of the link 406, and out of engagement with the upper face of the transverse rod 411. This movement of the front or free end of the support 390 from its normal position causes the shoulder 405 to engage the front edge of the arm 399 and move said arm with the support 390 until the front shoulder 403 coacts with the shoulder 404, thus limiting further movement of the arm 399 and the support 390.

Any suitable device may be used to supply ink to the recording members, but as the same forms no part of this present invention, it has been thought unnecessary to illustrate and describe such device.

The construction and operation of this calculating machine will now be readily understood upon reference to the foregoing description and the accompanying drawing, and it will be apparent that more or less change may be made in the component parts thereof without departing from the spirit of my invention.

Having thus fully described my invention, what I claim as new and desire to secure by Letters Patent is:—

1. In a calculating machine, a series of keys and means movable different distances by the respective keys, each key having a shank including two sections, one of which sections coacts with said means and is adjustable axially relatively to the other to determine the distance said means is actuated by the key, substantially as and for the purpose described.

2. In a calculating machine, a key provided with a shank having its lower end formed with a lengthwise threaded socket split longitudinally, a part having one end threaded and adjustable lengthwise in the socket of the key and its other end provided with an engaging face, and movable means in the path of said face actuated thereby, substantially as and for the purpose specified.

3. In a calculating machine, a frame, a key guided in the frame, and means carried by the key for preventing rotation of the key and limiting the return movement thereof, substantially as and for the purpose specified.

4. In a calculating machine, a frame provided with a guide, a key having a cylindrical shank movable in the frame, and means detachably secured to the shank and provided with arms extending parallel to the shank in opposite directions, one arm being movable in the guide for preventing rotation of the key, and the other arm coacting with the frame for limiting the return movement of the key, substantially as and for the purpose set forth.

5. In a calculating machine, a frame, a plurality of series of keys, and a supplemental frame for each series of keys, the supplemental frame being secured in position on the first-mentioned frame and a single clamping means for securing the supplemental frame to the first-mentioned frame, substantially as and for the purpose described.

6. In a calculating machine, a frame, a plurality of series of keys, and a supplemental frame for each series of keys, the supplemental frames being arranged side by side in engagement with each other, and a single fastening member for each supplemental frame, located at one end thereof, substantially as and for the purpose set forth.

7. In a calculating machine, a frame including parallel bars, a plurality of series of keys, and a supplemental frame for each series of keys, each supplemental frame comprising a top plate, the opposite ends of which rest on said bars, and the supplemental frames being arranged side by side with the edges of the top plates in engagement, and a fastening member extending through each frame into one of said bars, substantially as and for the purpose described.

8. In a calculating machine, a frame provided with opposing cross-bars, a series of keys, a supplemental frame for the series of keys having one end provided with opposing shoulders for detachably engaging opposite surfaces of one of the cross-bars, and its other end provided with a shoulder for engaging the other cross-bar, a screw for detachably securing the last-mentioned shoulder to the contiguous cross-bar, and a shoulder on the other cross-bar for preventing lateral movement of the end of the supplemental frame provided with said opposing shoulders, substantially as and for the purpose specified.

9. In a calculating machine, a frame having a socket, a key movable into a number of positions and having a shank provided with a plurality of substantially V-shaped notches, a recording member, a controlling member coöperating with the key for governing the setting of the recording member, a stop movable endwise in a direction disposed at substantially right angles to the line of movement of the key, and having one end supported in the socket and its other end pointed and movable into and out of said notches, and a spring for yieldingly holding the stop in its operative position, substantially as and for the purpose set forth.

10. In a calculating machine, a plurality of keys, movable locking members for holding the keys in a predetermined position, means provided on the keys for moving the locking members into operative position, and means provided on the keys and coöperating with the locking members for moving said members from their operative position, substantially as and for the purpose described.

11. In a calculating machine, a plurality of independently movable keys, pivoted locking members for holding the keys in a predetermined position, said members being movable simultaneously and being each provided with a beveled engaging face, arms carried by the keys for moving the locking members into operative position, and other arms carried by the keys and coöperating with said engaging faces when the locking members are in operative position, to move the same from said position, substantially as and for the purpose specified.

12. In a calculating machine, a frame, a key guided in the frame, a movable locking member for holding the key in a predetermined position, and means movable with the key for preventing rotation thereof, said means coöperating with the locking member for moving the same into its operative position, substantially as and for the purpose set forth.

13. In a calculating machine, a frame, a key having a cylindrical shank guided in the frame, a locking member for holding the key in a predetermined position, and means detachably secured to the shank, comprising a part for preventing rotation of the key, a part coöperating with the frame for limiting the return movement of the key, a part for moving the locking member into its operative position, and a part coöperating with the locking member for holding the key in a predetermined position, substantially as and for the purpose described.

14. In a calculating machine, a frame, a key provided with an arm, and a pivoted locking member for holding the key in a predetermined position, said member being provided with a shoulder arranged in the path of said arm and coöperating with the frame for limiting the movement of the locking member in one direction, substantially as and for the purpose specified.

15. In a calculating machine, a frame, a key, a pivoted locking member for holding the key in a predetermined position, a fixed shoulder on the frame, a pivoted arm for moving the locking member into its operative position, said arm having a cutout for receiving the shoulder, the wall of the cutout coöperating with said shoulder to limit the movement of the pivoted arm in one direction, and means for yieldingly holding the arm in either its operative or inoperative position, substantially as and for the purpose set forth.

16. In a calculating machine, a frame, a key, a pivoted locking member for holding the key in a predetermined position, a pivoted arm for moving the locking member into its operative or inoperative position, and a spring having one end pivotally supported on the frame and its other end pivoted to the free end of the arm for holding the same in either its operative or inoperative position, the pivot for uniting the contiguous ends of the arm and the spring being held by said spring on opposite sides of a line drawn through the axes of the locking member and the spring, substantially as and for the purpose described.

17. In a calculating machine, a frame, a series of keys, locking members for engaging and holding the keys in a predetermined position, means common to all of the locking members for carrying all of said members into operative position, and means for forcing the locking members from operative position, the latter means coöperating with the first-mentioned means, substantially as and for the purpose specified.

18. In a calculating machine, a frame, a plurality of series of keys, locking members for holding the keys in a predetermined position, means common to all of the locking members of each series for moving the members of said series into operative position, and means for forcing the locking members of all the series from operative position, the latter means comprising a plurality of links pivoted at their upper ends to the frame at opposite sides of the plurality of series of keys, a longitudinally movable bar common to all series of keys and coöperating with the first-mentioned means of each series, the bar being pivoted to the lower ends of said links and extending transversely of the plurality of series of keys, substantially as and for the purpose described.

19. In a calculating machine, a key, a locking member for holding the key in a predetermined position, means coöperating with the locking member for forcing the same from operative position, said means being provided with a shoulder, an actuating member movable to and fro and provided with a shoulder coacting with the former shoulder for operating said means, one of the shoulders being fixed to the part provided therewith, and the other being movable from its normal position in one direction relatively to the part provided therewith, and being prevented from movement beyond such position in the opposite direction relatively to said part, and means for returning the first-mentioned means to its normal position, substantially as and for the purpose described.

20. In a calculating machine, a key, a locking member for holding the key in a predetermined position, means coöperating with the locking member for forcing the same from operative position, said means being provided with a shoulder fixed thereto, an actuating member movable to and fro, a tappet pivoted to the actuating member and having an engaging end or shoulder for coacting with the first-mentioned shoulder, and also having a second engaging shoulder, a stop for coacting with the second-mentioned shoulder of the tappet to limit the movement thereof in one direction, a spring for engaging the second-mentioned shoulder of the tappet with the stop, and means for returning the first-mentioned means to its normal position, substantially as and for the purpose specified.

21. In a calculating machine, a frame, a key, a locking member for holding the key in a predetermined position, a movable bar for forcing the locking member from operative position, a vertically reciprocating key for moving the bar in one direction, means for moving the bar in the opposite direction, and a bell-crank lever pivoted to the frame and having its ends respectively connected to the key and the bar for transmitting motion from one to the other, substantially as and for the purpose set forth.

22. In a calculating machine, an actuating member, a key, a recording member, a calculating member, a controlling member, movable means between the key and controlling member and movable power-transmitting means between the controlling member and recording member, and additional movable means between the controlling member and calculating member, substantially as and for the purpose set forth.

23. In a calculating machine, an actuating member, a recording member provided with indicating characters, means for setting the recording member, an aliner for effecting the desired alinement of the characters in the printing field, and connections for operating the aliner, comprising a link composed of sections movable endwise relatively to each other and provided with shoulders normally coacting to limit the relative movement of the sections, and a spring for yieldingly holding said shoulders in engagement with each other, substantially as and for the purpose set forth.

24. In a calculating machine, an actuating member, a calculating mechanism, a movable controlling member, a power-transmitting element carried with the controlling member and movable relatively thereto into and out of position to coact with the calculating mechanism and means for positively effecting the movement of the power-transmitting member relatively to the controlling member, substantially as and for the purpose described.

25. In a calculating machine, an actuating member movable about an axis and provided with a cam-shoulder having a face extending at an angle to a radial line passing through the axis and said face, the cam-shoulder also having a face extending from the former face substantially concentric to said axis, a calculating mechanism, a movable controlling member, a power-transmitting element carried with the controlling member, and means connected to the power-transmitting element and coacting with said faces of the cam-shoulder for moving the power-transmitting element relatively to the controlling member to coöperate with the calculating mechanism, substantially as and for the purpose specified.

26. In a calculating machine, an actuating member, a calculating mechanism comprising a toothed wheel, a rectilinearly movable controlling member, a power-transmitting element having one end pivotally connected to the controlling member and its other end provided with teeth, said element being carried rectilinearly with the controlling member, and means for moving the free end of the power-transmitting element relatively to the controlling member into and out of engagement with said toothed wheel, substantially as and for the purpose set forth.

27. In a calculating machine, an actuating member, a calculating mechanism, a movable controlling member, and a pair of power-transmitting parts carried with the controlling member and movable simultaneously relatively thereto into and out of position to coact with the calculating mechanism, substantially as and for the purpose described.

28. In a calculating machine, calculating mechanism, a movable controlling member for actuating the calculating mechanism, a pair of power-transmitting parts for transmitting the movement of the controlling member to the calculating mechanism, said parts being fixed with respect to each other and carried with the controlling member and movable simultaneously relatively thereto into and out of position to coact with the calculating mechanism, and means for shifting said parts into or out of operative connection with the calculating mechanism, substantially as and for the purpose set forth.

29. In a calculating machine, calculating mechanism including a gear wheel, a movable controlling member for actuating the calculating mechanism, and a pair of racks extending parallel to each other, and designed to mesh with diametrically opposite sides of the gear wheel, the racks being rigidly connected and being both carried with the controlling member, and means for simultaneously shifting the racks for carrying one of said racks into mesh with the gear wheel and the other rack out of mesh therewith, substantially as and for the purpose described.

30. In a calculating machine, calculating mechanism including a gear wheel, a movable controlling member for actuating the calculating mechanism, a power-transmitting element pivotally connected to the controlling member and having racks extending parallel to each other and adapted to mesh with diametrically opposite sides of the gear wheel, and means for shifting the power-transmitting element on its pivot for moving either rack into mesh with the gear wheel and the other rack out of mesh therewith, substantially as and for the purpose specified.

31. In a calculating machine, calculating mechanism comprising a gear wheel, indicating mechanism for showing the example contained in the calculating mechanism, a movable controlling member formed with a rack, a power-transmitting element movable with the controlling member, and including racks extending parallel to each other and adapted to mesh with diametrically opposite sides of the gear wheel, means for shifting the power-transmitting element to carry either rack into mesh with the gear wheel and the other rack out of mesh therewith, and power-transmitting means between the controlling member and the indicating mechanism, said means comprising a toothed member meshing with the rack of the controlling member, substantially as and for the purpose set forth.

32. In a calculating machine, an actuating member movable about an axis and provided with a cam-shoulder having diverging faces extending at an angle to a radial line passing through the axis and the junction of said faces, the cam-shoulder also having faces extending from the outer portions of the diverging faces substantially concentric to said axis, a calculating mechanism comprising a toothed wheel, a movable controlling member, a power-transmitting element carried with the controlling member and provided with opposing toothed parts or arms for coacting with opposite surfaces of the toothed wheel, and means connected to the power-transmitting element and coacting with said faces of the cam-shoulder for moving the power-transmitting element in opposite directions relatively to the controlling member to coöperate with the toothed wheel of the calculating mechanism, substantially as and for the purpose specified.

33. In a calculating machine, an actuating member, a calculating mechanism comprising a toothed wheel, a rectilinearly movable controlling member, a power-transmitting element having one end pivotally connected to the controlling member, and its other end provided with opposing toothed parts or arms for coacting with opposite surfaces of the toothed wheel, said element being carried rectilinearly with the controlling member and having its opposing arms normally out of engagement with the toothed wheel, and means for moving the power-transmitting element relatively to the controlling member and forcing said arms into and out of engagement with the toothed wheel, substantially as and for the purpose set forth.

34. In a calculating machine, an actuating member, a calculating mechanism, a movable controlling member, a power-transmitting element carried with the controlling member during a portion of the travel thereof, said controlling member, during a portion of the travel thereof, being movable relatively to the power-transmitting element and means for positively effecting the movement of the power-transmitting member relatively to the controlling member, substantially as and for the purpose described.

35. In a calculating machine, an actuating member, a calculating mechanism, a movable controlling member, a power-transmitting element, and means carried by the controlling member and connected to the power-transmitting element for moving the same with the controlling member, said means being movable relatively to the controlling member for permitting said member to move relatively to the power-transmitting element, substantially as and for the purpose specified.

36. In a calculating machine, an actuating member, a calculating mechanism, a movable controlling member, a bell-crank lever pivoted to the controlling member and provided with an upright arm, and with a horizontal forwardly extending arm having the lower portion of its front face formed with an engaging surface extending downwardly and rearwardly, means for holding the lever from movement relatively to the controlling member, means for moving the lever relatively to the controlling member, and a power-transmitting element coacting with the calculating mechanism, said element being connected to the upright arm of the lever and movable thereby, substantially as and for the purpose set forth.

37. In a calculating machine, an actuating member, a calculating mechanism, a movable controlling member, a power-transmitting element, means carried by the controlling member and connected to the power-transmitting element for moving the same with the controlling member, said means being movable relatively to the controlling member for permitting said member to move relatively to the power-transmitting element, a catch pivoted to the controlling member and provided with a shoulder for engaging said means and preventing movement thereof relatively to the controlling member, means for holding the catch in its operative position, and means for forcing the catch from its operative position, substantially as and for the purpose described.

38. In a calculating machine, an actuating member, a calculating mechanism, a movable controlling member, a power-transmitting element, a bell-crank lever pivoted to the controlling member and provided with an upright arm connected to the power-transmitting element, and with a substantially horizontal forwardly extending arm having the lower portion of its front face formed with an engaging surface extending downwardly and rearwardly, and having a rear face provided with a notch, a spring connecting the controlling member and the bell-crank lever, a catch pivoted to the controlling member and having the lower portion of its front face provided with an engaging surface extending downwardly and rearwardly and arranged in advance of the former engaging surface, said catch being provided with a shoulder for entering the notch in the bell-crank lever and preventing movement thereof relatively to the controlling member, a spring for forcing the catch into its operative position, and an abutment for coacting with said engaging surfaces, substantially as and for the purpose specified.

39. In a calculating machine, an actuating member, a calculating mechanism, a movable controlling member, a power-transmitting element pivotally connected to the controlling member and coöperating with the calculating mechanism, and means coacting with the actuating member for moving the power-transmitting element relatively to said controlling member, substantially as and for the purpose set forth.

40. In a calculating machine, an actuating member movable about an axis and provided with a cam-shoulder having diverging faces, opposite arc-shaped faces extending from the first-mentioned faces, and a face arranged between the arc-shaped faces and terminating at its end opposite to the diverging faces in an inclined surface, a calculating mechanism comprising a toothed wheel, a movable controlling member, a power-transmitting element pivotally connected to the controlling member and provided with opposing toothed parts for coacting with opposite surfaces of the toothed wheel, and means between the actuating member and the power-transmitting element comprising a movable part coacting with said faces of the cam-shoulder, substantially as and for the purpose described.

41. In a calculating machine, an actuating member movable about an axis, a calculating mechanism comprising a toothed wheel, a movable controlling member, a power-transmitting element pivotally connected at one end to the controlling member, and having its other end provided with opposing toothed parts or arms for coacting with opposite surfaces of the toothed wheel, one of said arms being formed with a lengthwise slot, and a lever pivoted to the frame intermediate of its ends, one arm of the lever being provided with a shoulder movable in said slot, and the other arm of the lever consisting of a main section having its front end provided with upper and lower shoulders, an intermediate section extending between the upper and lower shoulders and adjustable about the axis of the lever relatively to the main section and provided with upper and lower shoulders, screws carried by the first-named shoulders for adjusting the intermediate section, an end section connected by a substantially upright pivot to the intermediate section and extending between and forwardly beyond the second-mentioned shoulders, and being movable laterally relatively thereto, the end section being provided with a shoulder for coacting with the actuating member, and a spring carried by the intermediate section and engaging the end section, substantially as and for the purpose specified.

42. In a calculating machine, a frame, an actuating member movable about an axis, a calculating mechanism comprising a toothed wheel, a movable controlling member, a power-transmitting element pivotally connected to the controlling member and provided with opposing toothed parts or arms for coacting with opposite surfaces of the toothed wheel, means for moving the power-transmitting element relatively to the controlling member, a hand-piece pivoted to the frame, a spring for holding the hand-piece in its normal position, and a link connecting said means and the hand-piece, the link including sections movable endwise relatively to each other and provided with shoulders normally coacting to limit the relative movement of the sections, and a spring for yieldingly holding said shoulders in engagement with each other, substantially as and for the purpose set forth.

43. In a calculating machine, a frame, an actuating member movable about an axis and provided with a cam-shoulder having diverging faces, opposite arc-shaped faces extending from the first-mentioned faces, and a face arranged between the arc-shaped faces and terminating at its end opposite to the diverging faces in an inclined surface, a calculating mechanism comprising a toothed wheel, a rectilinearly movable controlling member, a bell-crank lever pivoted to the controlling member and provided with an upright arm, and with a substantially horizontal forwardly extending arm having the lower portion of its front face formed with an engaging surface extending downwardly and rearwardly, and having a rear face provided with a notch, a spring connecting the controlling member and the bell-crank lever, a catch pivoted to the controlling member and having the lower portion of its front face provided with an engaging surface extending downwardly and rearwardly and arranged in advance of the former engaging surface, said catch being provided with a shoulder for entering the notch in the bell-crank lever and preventing movement thereof relatively to the controlling member, a spring for forcing the catch into its operative position, an abutment for coacting with said engaging surfaces of the bell-crank lever and the catch, a power-transmitting element pivoted at its front end to the upper end of the upright arm of the bell-crank lever, and having its other end provided with opposing toothed parts or arms for coacting with opposite surfaces of the toothed wheel, one of said arms being formed with a lengthwise slot, a lever pivoted to the frame intermediate of its ends, the rear arm of the lever being provided with a shoulder movable in said slot, and the front arm of the lever consisting of a main section having its front end provided with upper and lower shoulders, an intermediate section extending between the upper and lower shoulders and adjustable about the axis of the last-mentioned lever relatively to the main section and provided with upper and lower shoulders, screws carried by the first-named shoulders for adjusting the intermediate section, a front end section connected by a substantially upright pivot to the intermediate section and extending between and forwardly beyond the second-mentioned shoulders, and being movable laterally relatively thereto, the front end section being provided with a shoulder for coacting with said faces of the cam-shoulder, and a spring carried by the intermediate section and engaging the front end section, a hand-piece pivoted to the frame, a spring for holding the hand-piece in its normal position, and a link connecting the free end of said front end section and the hand-piece, the link including sections movable endwise relatively to each other and provided with shoulders normally coacting to limit the relative movement of the sections, and a spring for yieldingly holding said shoulders in engagement with each other, substantially as and for the purpose described.

44. In a calculating machine, a recording member, a movable controlling member for governing the setting of the recording member, and means for preventing movement of the controlling member from its normal position comprising a main section, and a second section carried by the main section and engaging the controlling member, the second section being prevented from movement beyond its normal position in one direction relatively to the main section, and being movable from its normal position in the opposite direction relatively to the main section for permitting the return of the controlling member to its normal position, substantially as and for the purpose specified.

45. In a calculating machine, an actuating member, a recording member, a movable controlling member for governing the setting of the recording member, means for preventing movement of the controlling member from its normal position, a power-transmitting device for forcing the first-mentioned means from operative position, and a part movable endwise and connected to the power-transmitting device for operating the same, substantially as and for the purpose set forth.

46. In a calculating machine, an oscillating actuating member having a plurality of shoulders arranged out of radial alinement with each other and with one nearer the axis thereof than the other, a recording member, a movable controlling member for governing the setting of the recording member, means for preventing movement of the controlling member from its normal position, a power-transmitting device for forcing the first-mentioned means from operative position, and means for actuating the power-transmitting device comprising a rock-arm, an engaging arm having one end connected to the rock-arm and its other end coöperating with the shoulders on the actuating member, said arm being movable endwise for forcing the rock-arm in one direction, a spring for returning the rock-arm to its normal position, and a second spring for rocking downwardly the free end of said engaging arm, substantially as and for the purpose described.

47. In a calculating machine, a key, a recording member, a stop, a longitudinally movable controlling member for governing the setting of the recording member, said controlling member also having a pivotal movement, movable means between the key and the controlling member, and a guide for the controlling member including a removable wearing part, surfaces of the guide engaging surfaces of the controlling member, two of the first-mentioned surfaces being separated a sufficient distance to permit of the pivotal movement of the controlling member, substantially as and for the purpose specified.

48. In a calculating machine, a key, a recording member, a stop, a longitudinally movable controlling member for governing the setting of the recording member, said controlling member also having a pivotal movement, movable means between the key and the controlling member, and a guide for the controlling member including a plate provided with a cutout in its upper edge for receiving the controlling member, opposing surfaces of the cutout engaging the sides of the controlling member, a wearing part removably secured in the inner end of the cutout and engaging the lower edge of the controlling member, and a member detachably fixed to the plate at one side of the cutout and provided with a lateral projection for engaging the upper edge of the controlling member, substantially as and for the purpose set forth.

49. In a calculating machine, a key, a recording member, a movable controlling member for governing the setting of the recording member, and movable means between the key and the controlling member comprising a lever having a part formed of inverted U-shaped cross-section, substantially as and for the purpose specified.

50. In a calculating machine, a key, a recording member, a movable controlling member for governing the setting of the recording member, and movable means between the key and the controlling member comprising a pair of levers, each lever being angular in form and pivoted at its angle, and one of the arms of each lever having gear teeth for meshing with the teeth provided on the corresponding arm of the other lever, substantially as and for the purpose described.

51. In a calculating machine, a key, a recording member, a movable controlling member for governing the setting of the recording member, and movable means between the key and the controlling member comprising a bell-crank lever consisting of a section provided with diverging arms, a second section of inverted U-shaped cross-section having one end fitted over and secured to one of said arms, and an engaging part fixed within the channel of the other end of the second section and projecting therefrom, said engaging part coacting with the controlling member, substantially as and for the purpose described.

52. In a calculating machine, a key, a recording member, a movable controlling member for governing the setting of the recording member, means for preventing movement of the controlling member from its normal position, a power-transmitting device for forcing the means from operative position, and movable means between the key and the controlling member comprising a lever having a part formed of inverted U-shaped cross-section, said part being provided at one side of its free end with an upturned portion coacting with the power-transmitting device, substantially as and for the purpose set forth.

53. In a calculating machine, a recording member, a movable controlling member for governing the setting of the recording member, said controlling member comprising a movable part carrying an engaging shoulder, and a screw for adjusting the position of the movable part relatively to the controlling member, means for moving the controlling member in one direction from its normal position, and an actuating member coacting with said engaging shoulder for moving the controlling member to its normal position, substantially as and for the purpose specified.

54. In a calculating machine, a recording member, a movable controlling member for governing the setting of the recording member, means for moving the controlling member in one direction from its normal position, and an actuating member comprising a tappet movable in one direction from its normal position relatively to the main part of the actuating member and prevented from movement in the opposite direction from its normal position relatively to said main part, the tappet coacting with the controlling member for moving the same to its normal position, substantially as and for the purpose set forth.

55. In a calculating machine, a key, a locking member for holding the key in a predetermined position, means coöperating with the locking member for forcing the same from operative position, said means comprising a movable part, an actuating member coacting with said movable part to operate the same, and means for preventing the operation of the movable part by the actuating member until after a predetermined number of operations thereof, said last-mentioned means including a pivoted arm coacting with the actuating member and movable from its normal position in one direction relatively to the remaining portion of said means, and being prevented from movement beyond such position in the opposite direction, substantially as and for the purpose described.

56. In a calculating machine, a calculating mechanism comprising a calculating member, transferring means including a lever pivoted at its upper end, and means for advancing the calculating member in one direction, said means being carried by the lower or free end of the lever and movable relatively to the lever, and means for moving the lever in the opposite direction, substantially as and for the purpose described.

57. In a calculating machine, a calculating mechanism comprising a calculating member, a toothed wheel revoluble with the calculating member, transferring means including a lever pivoted at its upper end and normally arranged in an upright plane and a pawl pivotally supported on the lower or free end of the lever and coacting with the toothed wheel to advance the calculating member in one direction, and means for moving the lever in opposite directions, substantially as and for the purpose set forth.

58. In a calculating machine, a calculating mechanism comprising a calculating member, transferring means including oppositely-acting pawls for advancing the calculating member in reverse directions, said pawls being supported independently of the calculating member and nonmovable with the calculating member when not operating the same, and means for holding one of the pawls in an inoperative position, and means for moving the oppositely-acting pawls in opposite directions, substantially as and for the purpose described.

59. In a calculating machine, a calculating mechanism comprising a calculating member, a toothed wheel revoluble with the calculating member, transferring means including a lever pivoted at its upper end, oppositely-acting pawls pivotally supported on the lower or free end of the lever and coacting with the toothed wheel to advance the calculating member in reverse directions, and means for holding one of the pawls in an inoperative position, and means coöperating with the last-mentioned means for causing the same to move the other of the pawls into an inoperative position and permitting the first-mentioned pawl to move into operative position, substantially as and for the purpose set forth.

60. In a calculating machine, a calculating mechanism comprising a calculating member, a toothed wheel revoluble with the calculating member, and transferring means including a lever pivoted at its upper end, oppositely-arranged pawls pivotally supported on the lower or free end of the lever and coacting with the toothed wheel to advance the calculating member in reverse directions, springs carried by the lever and coacting with the pawls for forcing the same into operative position, and a member pivoted to the lever and having arms coacting with the pawls for forcing the same alternately to their inoperative position, substantially as and for the purpose specified.

61. In a calculating machine, a calculating mechanism comprising a calculating member, a toothed wheel revoluble with the calculating member, transferring means including a lever, oppositely-arranged pawls pivotally supported on the lever and coacting with the toothed wheel to advance the calculating member in reverse directions, and a member pivoted to the lever and coacting with the pawls for forcing the same alternately to their inoperative position, and a lever pivoted on the first-mentioned lever and coacting with the pivoted member for moving the same in reverse directions, substantially as and for the purpose specified.

62. In a calculating machine, a calculating mechanism comprising a calculating member, a toothed wheel revoluble with said member, means including oppositely-arranged pawls for advancing the calculating member in reverse directions, a hand-piece, means connecting said hand-piece to the pawls, and a power-transmitting element having means for coacting with opposite surfaces of the toothed wheel, said element being connected to the hand-piece, substantially as and for the purpose set forth.

63. In a calculating machine, a calculating mechanism comprising a calculating member, a toothed wheel revoluble with the calculating member, and transferring means including a lever pivoted at its upper end, oppositely-arranged pawls pivotally supported on the lower or free end of the lever and coacting with the toothed wheel to advance the calculating member in reverse directions, means for causing the oppositely-arranged pawls to assume their operative position alternately, and a stop-shoulder carried by the lever for preventing undue movement of the calculating member, substantially as and for the purpose set forth.

64. In a calculating machine, a calculating mechanism comprising a calculating member, transferring means including a movable part for advancing the calculating member step by step, a spring for moving such part of the transferring means in one direction, a rocking member connected to the spring for varying the tension thereof, a hand-piece for operating the rocking member, and means for moving said movable part in the reverse direction against the action of the spring, substantially as and for the purpose set forth.

65. In a calculating machine, a calculating mechanism comprising a calculating member, transferring means including a movable part for advancing the calculating member step by step in one direction, a spring for moving such part of the transferring means in one direction, means for moving said movable part in the reverse direction against the action of the spring, a movable member connected to the spring for varying the tension thereof, a hand-piece for operating the movable member, and means connecting the transferring means and the hand-piece for causing said transferring means to advance the calculating member step by step in the opposite direction, substantially as and for the purpose described.

66. In a calculating machine, a calculating mechanism comprising a calculating member, a toothed wheel revoluble with said member, transferring means including a movable part and oppositely-arranged pawls actuated by the movable part for advancing the calculating member in reverse directions, a hand-piece, a spring for moving such part of the transferring means in one direction, a movable member connected to the spring for varying the tension thereof, means for moving said movable part in the reverse direction against the action of the spring, means connecting said hand-piece to the pawls and to the movable member connected to the spring, and a power-transmitting element having means for coacting with opposite surfaces of the toothed wheel, said element being connected to the hand-piece, substantially as and for the purpose specified.

67. In a calculating machine, a calculating mechanism comprising a calculating member, transferring means including a movable part for advancing the calculating member step by step, said part being provided with an adjustable engaging face, means for moving such part of the transferring means in one direction, and a rocking shaft provided with a cam for coacting with the adjustable face and forcing the movable part in the reverse direction, substantially as and for the purpose described.

68. In a calculating machine, a calculating mechanism comprising a calculating member, transferring means including a movable part for advancing the calculating member step by step, said part having an engaging face, means for moving such part of the transferring means in one direction, and a rocking shaft provided with a cam for coacting with the engaging face and forcing the movable part in the reverse direction, the cam being normally separated from the engaging face, substantially as and for the purpose specified.

69. In a calculating machine, a calculating mechanism comprising a calculating member, a toothed wheel revoluble with the calculating member, transferring means including a lever, oppositely-arranged pawls pivotally supported on the lever and coacting with the toothed wheel to advance the calculating member in reverse directions, and means for causing the pawls to assume their operative position alternately, means for moving the lever in one direction, and means for moving the lever in the reverse direction, said lever being movable relatively to the last-mentioned means for permitting the pawl to pass over one of the teeth of the toothed wheel, substantially as and for the purpose set forth.

70. In a calculating machine, a calculating mechanism comprising a calculating member, a toothed wheel revoluble with the calculating member, transferring means including a lever having an engaging face, oppositely-arranged pawls pivotally supported on the lever and coacting with the toothed wheel to advance the calculating member in reverse directions, and means for causing the pawls to assume their operative position alternately, a spring for moving the lever in one direction, and a rocking shaft provided with a cam for coacting with the engaging face and forcing the lever in the reverse direction, said engaging face and cam being normally separated for permitting the lever to move relatively to the cam and carry the pawl in operative position over one of the teeth of the toothed wheel, substantially as and for the purpose described.

71. In a calculating machine, a calculating mechanism comprising calculating members, a plurality of transferring means for advancing the calculating members, each of said means including a part movable in reverse directions, a catch coacting with the removable part of one of the transferring means, a rocking lever connected to the catch for forcing the same from operative position, and means on another of the calculating members for coacting with the rocking lever, substantially as and for the purpose described.

72. In a calculating machine, a calculating mechanism comprising a movable member, transferring means for advancing the movable member, means for restraining the transferring means from operation, and means on the movable member for forcing the restraining means from operative position, substantially as and for the purpose specified.

73. In a calculating machine, a calculating mechanism comprising calculating members, a plurality of transferring means for advancing the calculating members, each of said means including a part movable in reverse directions, catches for normally restraining such movable parts of the transferring means from operation, means on the calculating members for releasing the movable parts from the catches, springs for moving said parts in one direction, and actuating means for moving said parts throughout a portion of the strokes thereof against the action of the springs and thereby causing any of the calculating members in a predetermined position to release the movable part of one of the transferring means from the catch coacting therewith, said actuating means being then movable in the opposite direction for permitting movement of said released movable part by the spring connected thereto, and being finally movable for returning the released movable part to the position assumed for coacting with its catch, substantially as and for the purpose specified.

74. In a calculating machine, a calculating mechanism comprising calculating members, a plurality of transferring means for advancing the calculating members, each of said means including a part movable in reverse directions, catches for normally restraining such movable parts of the transferring means from operation, means on the calculating members for releasing the movable parts from the catches, springs for moving said parts in one direction, a rock-shaft provided with cams for moving said parts in the reverse direction, means for actuating the rock-shaft provided with a plurality of engaging surfaces, one in advance of the other, a spring for moving the last-mentioned means in one direction, and movable means for successively engaging said surfaces, and moving the means provided therewith against the action of the spring connected to said means, substantially as and for the purpose set forth.

75. In a calculating machine, a calculating mechanism comprising calculating members, a plurality of transferring means for advancing the calculating members step by step, each of said means including a movable part, means for moving such parts of the transferring means in one direction, means for moving said parts in the reverse direction, and an actuating member for operating the last-mentioned means throughout its complete stroke during each operation of the actuating member, substantially as and for the purpose described.

76. In a calculating machine, an actuating member, a calculating mechanism comprising calculating members, a plurality of transferring means for advancing the calculating members, each of said means including a movable part, means for moving such parts of the transferring means from their normal position, means for returning said parts to their normal position, and a connection between the actuating member and the last-mentioned means comprising an element having a predetermined number of movements during each operation of the actuating member, substantially as and for the purpose specified.

77. In a calculating machine, a calculating mechanism comprising calculating members, a plurality of transferring means for advancing the calculating members step by step, each of said means including a movable part, springs for moving such parts of the transferring means in one direction, a rock-shaft provided with cams for forcing the movable parts in the reverse direction, means for moving the rock-shaft, means for temporarily restraining the movement of the rock-shaft during each operation thereof, and means for forcing said restraining means from operative position, substantially as and for the purpose set forth.

78. In a calculating machine, a calculating mechanism comprising movable members, a plurality of transferring means for advancing the members, each of said means including a movable part, and catches for restraining such parts of the transferring means from operation, said catches being provided with connecting parts normally arranged in an inoperative position and with independently operating means for forcing said connecting parts into operative relation with the catches of the next order, substantially as and for the purpose described.

79. In a calculating machine, an actuating member provided with a plurality of shoulders, a calculating mechanism comprising calculating members, transferring means for advancing the calculating members, each of said means including a movable part, means for moving such parts of the transferring means in one direction, means for moving said parts in the reverse direction, a connection between the actuating member and the last-mentioned means comprising a reciprocating element provided with a yielding extension and separated shoulders coacting with the shoulders of the actuating member, a spring for returning the reciprocating element to its normal position, a pivoted arm provided at its free end with a roller engaging the lower edge of the reciprocating element, and a spring connected to the pivoted arm, substantially as and for the purpose set forth.

80. In a calculating machine, a calculating mechanism comprising movable members, a plurality of transferring means for advancing the members, each of said means including a movable part, and catches for restraining such parts of the transferring means from operation, each catch comprising two divisions, one movable relatively to the other for a limited distance and then movable with the other, and a connecting part normally arranged in an inoperative position and movable into its operative position by said one of the divisions when movable relatively to the other of said divisions, substantially as and for the purpose set forth.

81. In a calculating machine, a calculating mechanism comprising movable members, a plurality of transferring means for advancing the members, each of said means including a movable part, and catches for restraining such parts of the transferring means from operation, each catch comprising two divisions, one movable relatively to the other for a limited distance and then movable with the other, a connecting part normally arranged in an inoperative position and movable in a direction at substantially a right angle to the line of movement of said divisions, the connecting part having a beveled face coacting with the relatively movable division, and a spring for connecting the sections together, substantially as and for the purpose described.

82. In a calculating machine, a calculating mechanism comprising movable members, a plurality of transferring means for advancing the members, each of said means including a movable part, and catches for restraining such parts of the transferring means from operation, each catch comprising a connecting part normally arranged in an inoperative position and movable into its operative position, and a second connecting part normally arranged in an operative position for coacting with the first-mentioned connecting part of a contiguous catch, said first-mentioned connecting part being movable into an inoperative position upon the return to its normal position of the catch provided therewith, substantially as and for the purpose specified.

83. In a calculating machine, a calculating mechanism comprising movable members, a plurality of transferring means for advancing the members, each of said means including a movable part, and catches for restraining such parts of the transferring means from operation, each catch comprising two divisions, one movable relatively to the other for a limited distance and then movable with the other, a connecting part normally arranged in an inoperative position and movable into its operative position by said one of the divisions when movable relatively to the other of said divisions, a second connecting part pivoted to one of said divisions and having one arm normally arranged in position to coact with the first-mentioned connecting part of a contiguous catch, and a spring for holding the second-mentioned connecting part in its operative position relatively to the division of the catch provided therewith, substantially as and for the purpose set forth.

84. In a calculating machine, a calculating mechanism comprising a movable member, transferring means for advancing the member in reverse directions, means for restraining the transferring means from operation, and means on the movable member for forcing the restraining means from operative position when said member is moving in either direction, substantially as and for the purpose described.

85. In a calculating machine, a calculating mechanism comprising a rotatable member, transferring means including a movable part for advancing the rotatable member in reverse directions, means for restraining such part of the transferring means from operation, and angularly arranged faces on the periphery of the rotatable member for forcing said movable part from operative position when said member is moving in either direction, substantially as and for the purpose specified.

86. In a calculating machine, a calculating mechanism comprising a movable member, transferring means including a movable part for advancing the member in reverse directions, means for restraining such part of the transferring means from operation, a movable part for forcing the restraining means from operative position, means on the movable member for actuating the second-mentioned movable part when said member is moving in either direction, and means for moving said second-mentioned movable part into position to coact with said member when moving in one direction, substantially as and for the purpose set forth.

87. In a calculating machine, a calculating mechanism comprising movable members, a plurality of transferring means for advancing the members, each of said means including a movable part, catches for restraining such parts of the transferring means from operation, each catch comprising two divisions, one movable relatively to the other for a limited distance and then movable with the other, and a connecting part normally arranged in an inoperative position and movable into its operative position by said one of the divisions when movable relatively to the other of said divisions, movable parts for moving said relatively movable divisions of the catches, means on the movable members for actuating said second-mentioned movable parts when the members are moving in either direction, and means for moving said second-mentioned parts before the movement of the members in one direction, substantially as and for the purpose described.

88. In a calculating machine, a calculating mechanism comprising a movable member, transferring means including a movable part for advancing the member in reverse directions, means for restraining such part of the transferring means from operation, angularly-arranged faces on the periphery of the movable member for forcing the restraining means from operative position when said member is moving in either direction, a recording member, and a power-transmitting member provided with a plurality of means coacting with the movable member, substantially as and for the purpose specified.

89. In a calculating machine, a frame comprising upright opposing sides provided with lengthwise slots, a cross-bar disposed between the sides and having its ends contiguous to the slots, screws passed through the slots and into the ends of the cross-bar, a recording member, a platen, and a support for the platen, said support being mounted on the cross-bar and adjustable therewith for alining the printing point with the recording member, substantially as and for the purpose described.

90. In a calculating machine, a recording member, a non-revoluble shaft, a support pivoted on the shaft, a roller-platen journaled in the support and provided with a ratchet-wheel, an arm loosely mounted on the non-revoluble shaft, means for limiting the movement of the arm on the shaft, means for moving the arm with the support and permitting movement of the support independently of the arm, a pawl carried by the arm and coacting with the ratchet-wheel, a spring connected to the pawl, and means for moving the support on the shaft, substantially as and for the purpose set forth.

91. In a calculating machine, a recording member, a non-revoluble shaft provided with a shoulder, a support pivoted on the shaft, a roller-platen journaled in the support and provided with a ratchet-wheel, an arm loosely mounted on the non-revoluble shaft and provided with a shoulder for coacting with the first-mentioned shoulder and limiting the movement of the arm on the shaft, and means between the ratchet-wheel and the arm for rotating the platen during the movement of the support, substantially as and for the purpose described.

92. In a calculating machine, a recording member, a non-revoluble shaft, a support pivoted on the shaft, a roller-platen journaled in the support and provided with a ratchet-wheel, an arm loosely mounted on the non-revoluble shaft, means for limiting the movement of the arm on the shaft, a shoulder provided on the support and detachably engaging the arm for moving said arm with the support and permitting movement of the support independently of the arm, a pawl carried by the arm and coacting with the ratchet-wheel, a spring connected to the pawl, and means for moving the support on the shaft, substantially as and for the purpose specified.

93. In a calculating machine, a recording member, a non-revoluble shaft, a support pivoted on the shaft, a roller-platen journaled in the support and provided with a ratchet-wheel, an arm loosely mounted on the non-revoluble shaft, means for limiting the movement of the arm on the shaft, means for moving the arm with the support and permitting movement of the support independently of the arm, a pawl having one end pivoted to the arm and its other end engaging the ratchet-wheel, a spring having one end connected to the support and its other end connected to the pawl intermediate of its ends, and means for moving the support on the shaft, substantially as and for the purpose set forth.

94. In a calculating machine, a recording member, a non-revoluble shaft provided with a shoulder, a support pivoted on the shaft, a roller-platen journaled in the support and provided with a ratchet-wheel, an arm loosely mounted on the non-revoluble shaft and provided with shoulders for coacting with the first-mentioned shoulder and limiting the movement of the arm on the shaft, a shoulder provided on the support and detachably engaging the arm for moving said arm with the support and permitting movement of the support independently of the arm, a pawl having one end pivoted to the arm and its other end engaging the ratchet-wheel, a spring having one end connected to the support and its other end connected to the pawl intermediate of its ends, and means for moving the support on the shaft, substantially as and for the purpose described.

95. In a calculating machine, a recording member, a support for a record-sheet movable toward and from the recording member to effect the making of a record, an actuating member, and a power-transmitting element movable endwise in substantially the same plane as the movable support and having one end connected to the support and its other end connected to the actuating member, substantially as and for the purpose specified.

96. In a calculating machine, a recording member, a movable support for a record-sheet, an actuating member provided with a shoulder, means having oppositely extending arms, one projecting into the path of the shoulder on the actuating member and movable thereby in one direction, power-transmitting means arranged between the support and the other arm of the first-mentioned means and movable in one direction by said means, and a spring for moving the power-transmitting means in the reverse direction, substantially as and for the purpose set forth.

97. In a calculating machine, a recording member, a movable support for a record-sheet, an actuating member, a power-transmitting element comprising a main part provided with opposing separated shoulders, and a hook-shaped part for detachably engaging the free portion of the support, said hooked-shaped part being pivoted to the main part of the power-transmitting element and having a laterally projecting shoulder disposed between the separated shoulders for limiting the movement of the hook-shaped part in either direction, a spring for moving the hook-shaped part in one direction, and means connecting the actuating member and the power-transmitting element, substantially as and for the purpose described.

98. In a calculating machine, a recording member, a pivoted support for a record-sheet, an actuating member, a vertically-reciprocating power-transmitting element having its upper end provided with means for engaging the free portion of the support, means between the actuating member and the lower end of the power-transmitting element for moving said element in one direction, and a spring for moving the power-transmitting element in the reverse direction, substantially as and for the purpose specified.

99. In a calculating machine, a recording member, a pivoted support for a record-sheet, an actuating member provided with a shoulder, means having oppositely extending arms, one projecting into the path of the shoulder on the actuating member and movable thereby in one direction, a vertically-reciprocating power-transmitting element comprising a main part having its lower end connected to the other arm of said means and movable therewith, and its upper end provided with opposing separated shoulders, and a hook-shaped part for detachably engaging the free portion of the support, said hook-shaped part being pivoted to the main part of the power-transmitting element and having a laterally projecting shoulder disposed between the separated shoulders for limiting the movement of the hook-shaped part in either direction, a spring for moving the hook-shaped part in one direction, and a spring for moving the reciprocating element in a reverse direction, substantially as and for the purpose set forth.

100. In a calculating machine, a calculating mechanism, an indicator, a movable part, a hand-piece, a connection between the indicator and the movable part, a connection between the movable part and the hand-piece having a movement relatively to one of the members to which it is connected, and a locking member coacting with the calculating mechanism and the movable part for preventing movement of the indicator, substantially as and for the purpose specified.

101. In a calculating machine, a calculating mechanism, an indicator, a movable part, a hand-piece, a connection between the indicator and the movable part, a connection between the movable part and the hand-piece comprising an endwisely movable rod passing through the movable part and provided with shoulders on opposite sides thereof, and a spring interposed between the movable part and one of the shoulders, and a locking member coacting with the calculating mechanism and the movable part for preventing movement of the indicator, substantially as and for the purpose set forth.

102. In a calculating machine, a calculating mechanism, an indicator, means for moving the indicator relatively to the calculating mechanism, a movable part connected to the indicator, a pivoted locking member provided with engaging shoulders coacting, respectively, with the calculating mechanism and the movable part for preventing movement of the indicator, and a spring for forcing the locking member into an operative position, substantially as and for the purpose described.

103. In a calculating machine, a carriage, a calculating mechanism comprising a movable member supported by the carriage, a movable controlling member, means movable with the controlling member and coacting with the movable member for limiting the movement of the controlling member, said means being normally out of alinement with the movable member, means for moving the carriage and bringing the movable member into alinement with the first-mentioned means, locking means for preventing return of the carriage, and means for moving the last-mentioned means from operative position, substantially as and for the purpose specified.

104. In a calculating machine, a key, a carriage, a calculating mechanism comprising a movable member supported by the carriage, means between the key and carriage for moving the carriage and bringing the movable member into a predetermined position, said means comprising a rock-arm, a locking means for temporarily locking said means and preventing the return of the carriage, the locking means comprising two sections, one being pivoted and provided with an arm movable into and out of engagement with the rock-arm, and the other being pivoted to the first-mentioned section and provided with an arm, means coacting with the last-mentioned arm for moving said other section relatively to the first-mentioned section and also moving said sections together, and means for returning the carriage to its normal position, substantially as and for the purpose set forth.

105. In a calculating machine, a key, a carriage, a calculating mechanism comprising a movable member supported by the carriage, a controlling member, means movable with the controlling member and coacting with the movable member for limiting the movement of the controlling member, said means being normally out of alinement with the movable member, means between the key and the carriage for moving the carriage and bringing the movable member into a predetermined position, said means comprising a rock-shaft provided with a laterally extending arm, a locking means for temporarily locking said last-mentioned means and preventing the return of the carriage, the locking means comprising two sections, one being pivoted on an axis at an angle to the axis of the rock-shaft and provided with an arm movable into and out of engagement with the arm on the rock-shaft, and the other being pivoted to the first-mentioned section on an axis disposed at an angle to the axis of the first-mentioned section and provided with an arm, means coacting with the last-mentioned arm for moving said other section relatively to the first-mentioned section and also moving said sections together, and means for returning the carriage to its normal position, substantially as and for the purpose described.

106. In a calculating machine, a recording member, a movable controlling member for the recording member, a locking member for holding the controlling member in its normal position, a second locking member for holding the controlling member in its normal position, the second locking member being moved from operative position by the first-mentioned locking member, means for forcing the first-mentioned locking member from its operative position to release the controlling member, means for holding the second locking member in its inoperative position, and means for returning the locking members to their operative position, substantially as and for the purpose specified.

107. In a calculating machine, recording members, a plurality of controlling members, one for each recording member, the controlling members being provided with notches, locking members for holding the controlling members in their normal position, said locking members being provided with shoulders, a carriage, locking members pivoted to the carriage and supported thereby, each being provided with laterally projecting pins, one of said pins coöperating with the notch of the corresponding controlling member, movable arms supported by the carriage and each provided with a plurality of notches for engaging the other pins on the second-mentioned locking members, springs for yieldingly holding the movable arms in operative position, means for moving the carriage to carry the second-mentioned locking members out of alinement with the shoulders on the first-mentioned locking members, means for moving the first-mentioned locking members from and to their operative position, and means for returning the second-mentioned locking members to their operative position, comprising a rock-shaft, means on the rock-shaft coacting with said second-mentioned locking members, a hand-piece, and a link having its ends connected respectively to the rock-shaft and the hand-piece, substantially as and for the purpose set forth.

108. In a calculating machine, a calculating mechanism comprising calculating members, a plurality of controlling members, one for each calculating member, locking members, one for each controlling member, a plurality of movable means actuated respectively by the calculating members, and a connection between each movable means and one of the locking members of the next order, substantially as and for the purpose described.

109. In a calculating machine, a calculating mechanism comprising calculating members, a plurality of controlling members, one for each calculating member, locking members, one for each controlling member, a shaft, a plurality of levers loosely mounted on the shaft, corresponding arms of the levers coacting with the calculating members, a second shaft, a plurality of levers loosely mounted on the second shaft, corresponding arms of the second-mentioned levers coacting with the other arms of the first-mentioned levers, links having corresponding ends connected to the other arms of the second-mentioned levers, each of the links having its other end connected to a locking member of the next order, substantially as and for the purpose specified.

110. In a calculating machine, a recording member, a controlling member for the recording member, a locking member for holding the controlling member in its normal position, a carriage, a locking member supported by the carriage for holding the controlling member in its normal position, the second-mentioned locking member being moved from operative position by the first-mentioned locking member, means for forcing the first-mentioned locking member from its operative position to release the controlling member, means for moving the carriage to carry the second-mentioned locking member out of position to coact with the first-mentioned locking member, means for returning the locking members to their operative position, locking means for preventing the return of the carriage, means for forcing the locking means from operative position, and means for returning the carriage, substantially as and for the purpose specified.

111. In a calculating machine, a frame, a recording member, a controlling member for the recording member, a locking member for holding the controlling member in its normal position, a carriage, a locking member supported by the carriage for holding the controlling member in its normal position, the second-mentioned locking member being moved from operative position by the first-mentioned locking member, means for forcing the first-mentioned locking member from its operative position to release the controlling member, means for moving the carriage to carry the second-mentioned locking member out of position to coact with the first-mentioned locking member, said last-mentioned means comprising a rock-shaft provided with a cam and an arm, means for operating the rock-shaft, locking means for preventing return of the carriage comprising a rock-shaft arranged at an angle to the first-mentioned rock-shaft and provided at its opposite ends with arms, one of said arms being movable into the path of the arm on the first-mentioned rock-shaft after the same has been moved from its normal position, a key, means between the key and the other arm of the second-mentioned shaft including a longitudinally movable bar connected to the other radial arm of the second-mentioned rock-shaft, and a spring for returning the carriage, substantially as and for the purpose set forth.

In testimony whereof, I have hereunto signed my name in the presence of two attesting witnesses, at Syracuse, in the county of Onondaga, in the State of New York, this 11th day of September, 1905.

WILLARD LE GRAND BUNDY.

Witnesses:
S. DAVIS,
R. ARONSON.